(12) United States Patent
Garcia-Luna-Aceves

(10) Patent No.: US 11,876,725 B2
(45) Date of Patent: Jan. 16, 2024

(54) TECHNIQUES FOR AVOIDING COLLISIONS AMONG COMMUNICATIONS PACKETS BY USING SHARED TRANSMISSION QUEUE

(71) Applicant: The Regents of the University of California, Oakland, CA (US)

(72) Inventor: Jose Joaquin Garcia-Luna-Aceves, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 182 days.

(21) Appl. No.: 17/248,623

(22) Filed: Feb. 1, 2021

(65) Prior Publication Data

US 2021/0243135 A1   Aug. 5, 2021

Related U.S. Application Data

(60) Provisional application No. 63/055,684, filed on Jul. 23, 2020, provisional application No. 62/967,846, filed on Jan. 30, 2020.

(51) Int. Cl.
*H04L 47/52* (2022.01)
*H04L 69/22* (2022.01)
(Continued)

(52) U.S. Cl.
CPC .......... *H04L 47/522* (2013.01); *H04L 47/562* (2013.01); *H04L 47/622* (2013.01); *H04L 69/22* (2013.01)

(58) Field of Classification Search
CPC ... H04L 47/522; H04L 47/562; H04L 47/622; H04L 69/22
See application file for complete search history.

(56) References Cited

U.S. PATENT DOCUMENTS 5,418,787 A *  5/1995  Tiuraniemi ........... H04W 72/20
                                                           370/336
6,947,425 B1 * 9/2005  Hooper ................. H04L 49/351
                                                           370/395.4
(Continued)

OTHER PUBLICATIONS

Rodrigo Garces, Collision Avoidance and Resolution Multiple Access with Transmission Groups, 1997, UC Santa Cruz, pp. 3 & 9 (Year: 1997).*

(Continued)

*Primary Examiner* — Joseph L Greene
(74) *Attorney, Agent, or Firm* — Wolter Van Dyke Davis, PLLC; Eugene J. Molinelli

(57) ABSTRACT

Techniques for transmitting data packets on a shared channel in a data communications network include storing, on a local node, a current number of turns in a transmitting queue and a current turn based on packets received from other nodes on the channel. For a first local data packet to transmit, a local transmit turn is obtained based on successfully transmitting the packet in a time interval following a last turn in the queue. A data link layer header includes queue fields for the current number of turns, the local transmit turn, and a request for adding the local transmit turn. While there is still a remaining packet to transmit and when the current turn is the local transmit turn, the packet is transmitted with queue fields indicating the current number of turns, the current turn, and an indication of no new turn. An acknowledgement control packet indicates successful transmission.

30 Claims, 15 Drawing Sheets

(51) Int. Cl.
H04L 47/62 (2022.01)
H04L 47/56 (2022.01)

(56) References Cited

U.S. PATENT DOCUMENTS

2007/0116024 A1* 5/2007 Zhang ............... H04L 47/50
370/412
2016/0112824 A1* 4/2016 Tuset Peiró ........ H04W 74/085
370/235

OTHER PUBLICATIONS

Abramson, "The Aloha System—Another Alternative for Computer Communications," Proc. Fall Joint Computer Conference '70, 1970.
Bao, et al., "A New Approach to Channel Access Scheduling for Ad Hoc Net-works," Proc. ACM MobiCom '01, Jul. 2001.
Bao, et al., "Hybrid Channel Access Scheduling in Ad Hoc Networks," Proc. IEEE ICNP '02, Nov. 2002.
Bertsekas, et al., "Data Networks", Prentice-Hall, 1992.
Capetanakis, "Tree Algorithm for Packet Broadcasting Channel," IEEE Trans. Info. Theory, 1979.
Chu et al., "Aloha and Q-Learning based Medium Access Control for Wireless Sensor Networks," Proc. IEEE ISWCS 12, 2012.
Clazzer et al., "Enhancing Contention Resolution ALOHA Using Combining Techniques," IEEE Trans. Commun., 2018.
Garces, et al., "Collision Avoidance and Resolution Multiple Access with Transmission Groups," Proc. IEEE INFOCOM 97, Apr. 1997.
Garcia-Luna-Aceves, et al., "NOMAD: Deterministic Collision-Free Channel Access with Channel Reuse in Wireless Networks," Proc. IEEE Secon '11, Jun. 2011.
Garcia-Luna-Aceves, "Carrier-Sense Multiple Access with Collision Avoidance and Detection," Proc. ACM MSWiM '17, 2017.
Garcia-Luna-Aceves, "KALOHA: ike i ke Aloha," Proc IEEE Mass 2019, Nov. 2019.
Gummalla, et al., "Wireless Medium Access Control Protocols," IEEE Commun. Surveys & Tutorials, 2000.
Hornig, "A Standard for the Transmission of IP Datagrams over Ethernet Networks," RFC 894, IETF, Apr. 1984.
Jakllari, et al., "A Sync-less Time-Divided MAC Protocol for Mobile Ad-hoc Networks," IEEE MILCOM '09, Oct. 2009.
Jakllari, et al., "A Framework for Frameless TDMA Using Slot Chains," Proc. IEEE Mass 2012, Oct. 2012.
Jurdak, et al., "A Survey, Classification and Comparative Analysis of Medium Access Control Protocols for Ad Hoc Networks," IEEE Communications Surveys, 2004.
Khaleghi, et al., "Near-Far Effect on Coded Slotted Aloha," Proc. IEEE PIMRC 2017 Workshop on The Internet of Things (IoT), Oct. 2017.
Kissling, "Performance Enhancements for Asynchronous Random Access Protocols over Satellite," Proc. IEEE ICC 11, Jun. 2011.
Kleinrock, et al., "Packet Switching in Radio Channels: Part I—Carrier Sense Multiple-Access Modes and Their Throughput-Delay Characteristics," IEEE Trans. Commun., 1975.
Laya et al., "Goodbye, Aloha!," IEEE Access, Apr. 2016.
Muir, et al., "Supporting Real-Time Multimedia Traffic in a Wireless LAN," Proc. SPIE Multimedia Computing and Networking '97, Feb. 1997.
Muir, et al., "An Efficient Packet-Sensing MAC Protocol for Wireless Networks," Mobile Networks and Applications, 1998.
Paolini, et al., "Coded Slotted Aloha: A Graph-Based Method for Uncoordinated Multiple Access," IEEE Trans. Information Theory, Dec. 2015.
Ramalho, et al., "RTP Payload Format for G.711.0," Rfc 7655, IETF, Nov. 2015.
Ramanathan, et al., "Scheduling Algorithms for Multihop Radio Networks," IEEE/ACM Trans. Networking, 1993.
Roberts, "Aloha Packet System with and without Slots and Capture," ACM SIGCOMM CCR, Apr. 1975.
Schoute, "Dynamic Frame Length Aloha," IEEE Transactions on Communications, 1983.
Sgora, et al., ,"A survey of TDMA Scheduling Schemes in Wireless Multihop Networks," ACM Computing Surveys, 2015.
Stefanovic, et al., "Frameless Aloha Protocol for Wireless Networks," IEEE Commun. Letters, Dec. 2012.
Tang, et al., "Hop Reservation Multiple Access (HRMA) for Ad-Hoc Networks," Proc. IEEE INFOCOM '99, 1999.
Tobagi, et al., "The Effect of Acknowledgment Traffic on the Capacity of Packet-Switched Radio Channels," IEEE Trans. Commun., Jun. 1978.
Vergados, et al., "Local Voting: Optimal Distributed Node Scheduling Algorithm for Multihop Wireless Networks," INFOCOM Workshop '17 , 2017.
Xu, et al., "A Distributed Queuing Random Access Protocol for a Broadcast Channel," Proc. ACM SIGCOMM '93, Oct. 1993.
Yan, et al., "Adaptation of the Aloha-Q Protocol to Multi-Hop Wireless Sensor Networks," Proc. IEEE European Wireless '14, May 2014.
Yu, et al., Stability Analysis of Frame Slotted Aloha Protocol, IEEE Trans. Mobile Computing, May 2017.
Zhu, et al., "A Five Phase Reservation Protocol (FPRP) for Mobile Ad Hoc Networks," Proc. IEEE INFOCOM '98, 1998.

* cited by examiner

TECHNIQUES FOR AVOIDING COLLISIONS AMONG COMMUNICATIONS PACKETS BY USING SHARED TRANSMISSION QUEUE

CROSS-REFERENCE TO RELATED APPLICATIONS

This application claims benefit of Provisional Appln. 62/967,846, filed Jan. 30 2020, and Provisional Appln 63/055,684, filed Jul. 23 2020, under 35 U.S.C. § 119(e), the entire contents of each of which are hereby incorporated by reference as if fully set forth herein.

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular lower layer protocol typically indicates a type for the next higher layer protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

In Layer 2 of a network, the Media Access Control (MAC) sublayer provides addressing and channel access control mechanisms that enable several terminals or network nodes to communicate in a network.

Some protocols pass protocol-related information among two or more network nodes in special control packets that are communicated separately, and which include a payload of information used by the protocol itself, or include an empty payload, rather than a payload of data to be communicated to a higher layer or another application. These control packets and the processes at network nodes that utilize the control packets are said to be in another dimension, a "control plane," distinct from the "data plane" dimension that includes the data packets with payloads for other applications at the end nodes or higher layer protocols.

In most wireless ad-hoc networks, the nodes compete for access to shared wireless medium, often resulting in collisions (interference). Many ad-hoc network nodes use half duplex transceivers, which use the same radio channel for transmitting and receiving. Such half duplex nodes cannot receive while transmitting. Thus, it is possible, and even common, due to collisions, for such nodes to miss the control plane messages and headers that are designed to control the flow of packets.

Carrier-sense multiple access (CSMA) is arguably the most widely used technique for the sharing of common radio channels in ad-hoc networks today, as it is an integral part of the IEEE 802.11 protocol standard. According to CSMA, a transmitter will not transmit while a channel is active, as determined by sensing the carrier radio frequency. This traditional collision avoidance handshake consists of a request-to-send (RTS) message in one or more data packets, a clear-to-send (CTS) message in one or more data packets, a variable length data message in one or more data packet, and an acknowledgment (ACK) message in one or more data packets.

SUMMARY

It is recognized here that, in some circumstances, carrier sensing is either not available or becomes too onerous to carry the whole load of collision avoidance. Examples of limited availability include untethered networks with long propagation delays (e.g., underwater sensor networks, satellite networks and space networks), wireless networks that operate in noisy environments, and Internet of Things (IoT) deployments consisting of very simple nodes, such as wireless sensors. Especially when many end nodes, such as wireless sensors, share a single channel, the delays and computational burden of relying on CSMA alone, or at all, for collision avoidance can be excessive and interfere with desired functionality. Limited availability of carrier sensing due to these different circumstances, among others, are grouped under the term "reduced radio capacity."

Techniques are provided for avoiding packet collisions when sharing common radio channels in ad-hoc networks at nodes with reduced radio capacity by sharing information about a transmission queue. In some embodiments, carrier-sensing is not used. In other embodiments, carrier-sensing is used in a limited role to detect open turns in the shared queue.

In a first set of embodiments, a method includes storing, on a local node of the data communications network, a current number of turns in a transmitting queue and a current turn based on zero or more data packets received from other nodes on the channel. The method also includes, upon determining that there is a first local data packet of at least one local data packet to transmit, obtaining a local transmit turn for the local node in the queue based on successfully transmitting the first local data packet by the local node in a time interval following a last turn in the queue, thereby ending the last turn in the queue. The time interval is less than a maximum time interval value. A first data link layer header in the first data packet includes queue fields that hold data that indicate the current number of turns in the transmitting queue, the local transmit turn, and a request for adding the local transmit turn. The method further includes, while there is still a remaining local data packet of the at least one local data packet to transmit and the current turn is equal to the local transmit turn, transmitting the remaining local data packet in which the queue fields indicate the current number of turns in the transmitting queue, the current turn, and no request for adding a turn. Still further, the method includes determining that the local data packet was successfully transmitted.

In some embodiments of the first set, each new local transmit turn is added at an end of the queue, so that the current number of turns in the first local data packet is one greater than the current number of turns based on data packets received from other nodes on the channel.

In some embodiments of the first set, the queue fields also indicate whether the local node is relinquishing the local transmit turn after successful transmission of the transmitted local data packet. In some of these embodiments, after the local node relinquishes the local transmit turn, the method further includes decrementing by one the current number of turns in the transmitting queue.

In some embodiments of the first set, the first local data packet is not transmitted while the current number of turns is equal to a maximum size for the transmitting queue. In some of these embodiments, the maximum size for the transmitting queue is the maximum value represented by one byte of storage, and a length of the queue fields in the data link header is a sum of two bytes and two bits.

In some embodiments of the first set, said step of storing the current number of turns in the transmitting queue and the current turn further comprises storing NULL values for the current number of turns in the transmitting queue and the current turn based on zero data packets received from other nodes since the local node entered the network.

In some embodiments of the first set, the maximum time interval value is a maximum channel access time (MCAT) that includes a maximum receive-to-transmit turn-around time, a time needed to transmit a largest data packet allowed, and a maximum propagation delay in the network.

In some embodiments of the first set, the request for adding the local transmit turn comprises a data field that holds data that indicates a unique identifier for a node that most recently joins the queue.

In some embodiments of the first set, the method includes determining that the current turn ends when no carrier is sensed on the channel for a start time that is sufficient for a first bit to be sensed from a remote node that has started transmitting.

In other sets of embodiments, an apparatus or system or computer-readable medium, or data structure is configured to perform or operate with one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Techniques are described for avoiding packet collisions on a shared communications channel by using shared information about a transmitting queue. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of enhancing an ALOHA layer 2 protocol with four fields of certain lengths for sharing knowledge of a transmission queue, called an ALOHA-QS protocol. However, the invention is not limited to this context. In other embodiments, a shared transmission queue is used with more or fewer fields of longer or shorter lengths on the same or different data packets or control plane packets to share knowledge about a transmission queue.

1. OVERVIEW

Figure 1:
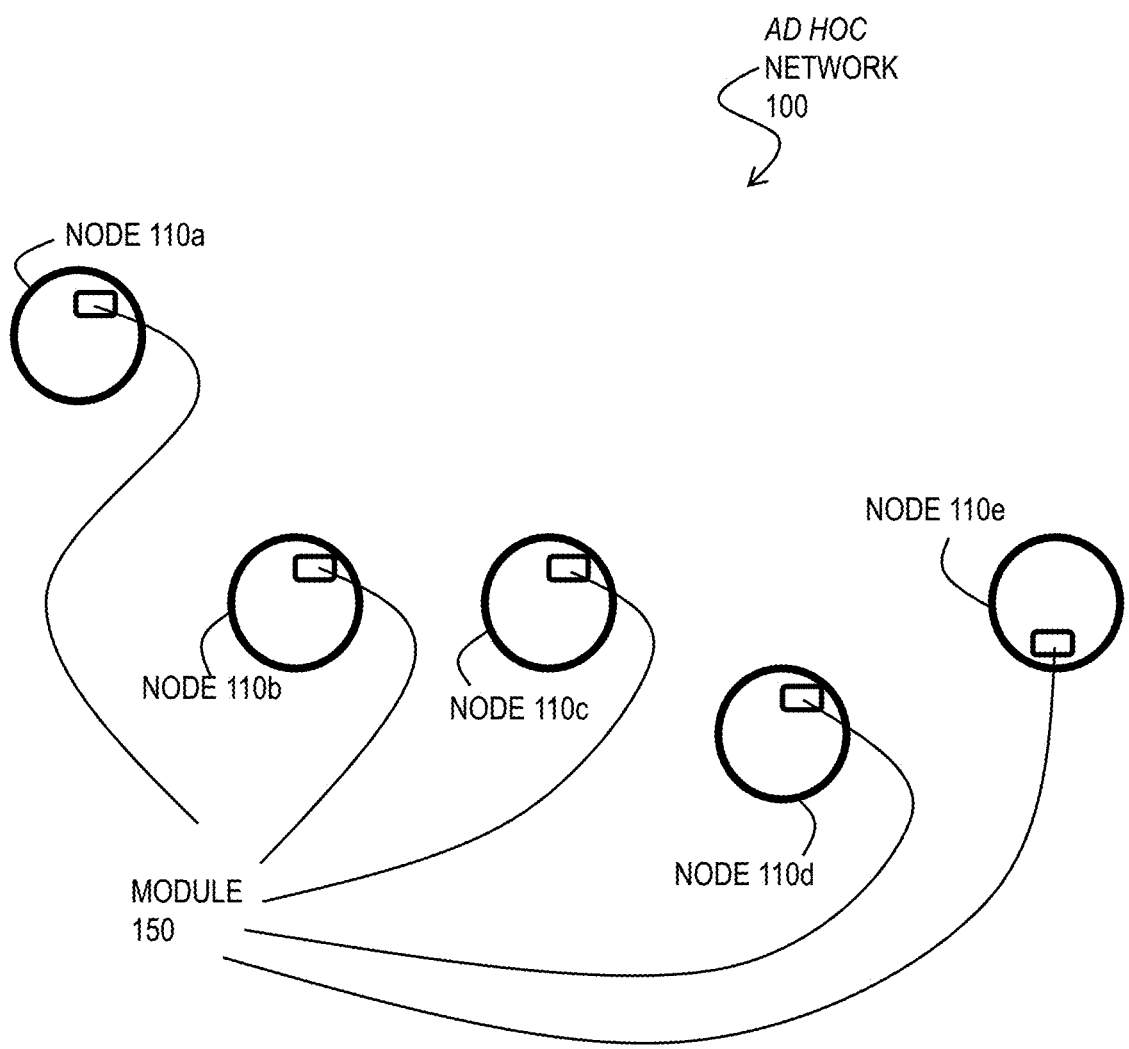
FIG. 1 is a block diagram that illustrates example nodes in an ad-hoc network, according to an embodiment.

FIG. 1 is a block diagram that illustrates example nodes 110a, 110b, 110c, 110d, 110e, (collectively referenced hereinafter as nodes 110) in an ad hoc network 100, according to an embodiment. In an ad hoc network, the relative positions of nodes are not fixed and the nodes can move in and out of range freely, e.g., the nodes are untethered. In the illustrated embodiment, each node 110 is in communication with the other nodes. The nodes 110 constitute an ad hoc network 100 in which data packets can hop, e.g., from node 110a to node 110b to node 110c to node 110d to node 110e and to any node (not shown) sharing a network (not shown) with node 110e.

To avoid collisions with data packets from adjacent nodes in a fully-connected network while transferring data packets from one node to the next, each of nodes 110a through node 110d includes a transmission queue sharing (QS) module 150 comprising hardware circuitry or software or some combination. In various embodiments, the QS module 150 performs all or part of one or more of the methods described herein. In some embodiments without carrier sensing, the QS module 150 does not rely on changes to, or interaction with, the physical layer (Layer 1) protocol, other than that the reception of packets decode correctly, and does not require clock synchronization or detection of idle and busy states for the shared channel. These embodiments without carrier sensing are described herein and in more detail in the Example Embodiments section. In some embodiments with carrier sensing, the QS module 150 is similar except that these embodiments do involve detection of idle and busy states for the shared channel. These embodiments are described herein and in more detail in the Example Embodiments section. In the illustrated embodiments, multiple access interference (MAI) is reduced and channel utilization is substantially increased for variable-length data packets and acknowledgment messages in a Layer 2 protocol, even when nodes operate using simple and inexpensive half-duplex transceivers.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2A:
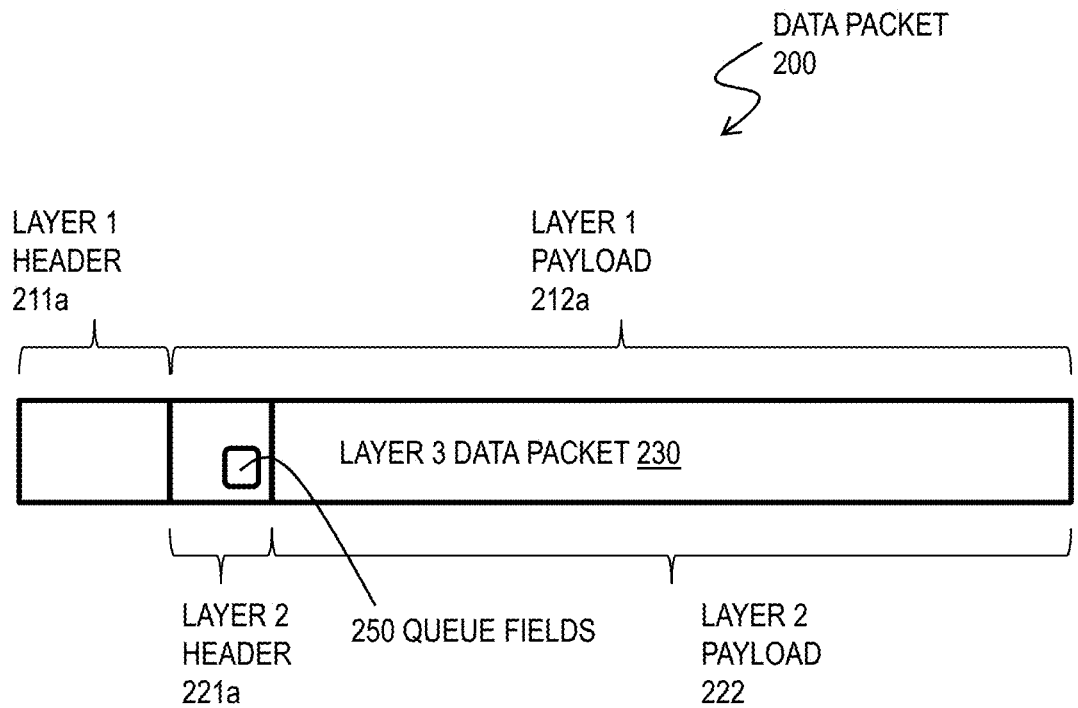
FIG. 2A and FIG. 2B are block diagrams that illustrate example packets with modified data link (layer 2) headers, according to an embodiment.
Figure 2B:
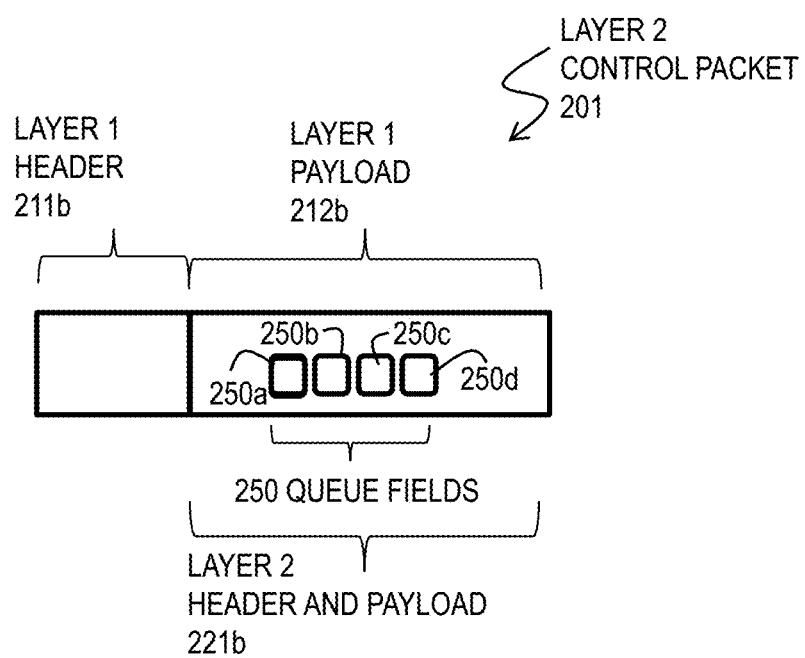

FIG. 2A and FIG. 2B are block diagrams that illustrate example packets with layer 2 headers, according to an embodiment. FIG. 2A illustrates an example data packet 200 with data provided for a Layer 3 or higher layer protocol, including an Internet protocol (IP). Such data packets 200 include a physical layer (Layer 1) header 211a made up of a series of bits that indicate values for various Layer 1 fields, and a Layer 1 payload 212a. The Layer 1 payload 212a includes a Layer 2 header 221a that is made up of a series of bits that indicate values for various Layer 2 fields, and a Layer 2 payload 222. The Layer 2 payload 222 includes a series of bits that indicate values for the various fields of the header and payload of the higher layer protocols encapsulated by the Layer 2 protocol. No further protocol needs to be illustrated to describe the various embodiments. According to various embodiments, the data link layer (layer 2) header includes one or more queue fields 250 that provide information to other nodes about transmission queue sharing (QS).

FIG. 2B illustrates an example control plane packet 201 for the Layer 2 protocol. As for the data packet 200, the control plane packet 201 includes a Layer 1 header 211b and Layer 1 payload 212b. However here, the Layer 1 payload only includes a header and payload for Layer 2 and no higher layer protocols. This kind of packet is used to communicate information just used by the Layer 2 protocol, such as any handshaking negotiation or acknowledgment that a data packet was successfully delivered over the shared channel, called an acknowledgement message (ACK). An ACK uniquely identifies the data packet being acknowledged, e.g., with a unique identifier in an ID field, not shown, in the Layer 2 header 221b of the control packet 201 that matches the unique identifier in the ID field, not shown, in the Layer 2 header 221a of the data packet 200. As depicted in this control plane packet, according to various embodiments, the queue fields 250 includes a queue size field 250a, a current turn field 250b, a data ending flag field 250c, and a newly added turn field 250d. In some embodiments not using carrier sensing, the newly added turn field 250d is a one bit flag that indicates a new turn has been added to the queue. In other embodiments that use carrier sensing, the newly added turn field 250d comprises many bits that uniquely identify the node 110 that most recently joined the queue.

An early Layer 2 protocol was called the ALOHA protocol, as described in Abramson, 1970, cited below did not require carrier sensing. ALOHA served as the basis for a plethora of medium-access control (MAC) protocols, which are Layer 2 protocols for untethered networks, which were designed and adopted for more than 50 years. Most of the later MAC protocols adopted carrier sensing that indicates the ability to listen to the channel to determine, even while transmitting, whether the channel is idle or busy. As indicated above, in circumstances of reduced radio capacity, such carrier sensing is not available or not reliable or too onerous.

In the basic ALOHA design, a node transmits whenever it has a packet to send, and then applies a back-off strategy after detecting that its transmission was unsuccessful, e.g., by failure to receive an ACK control plane packet within a specified time. Compared to the amount of work that has been done in the context of MAC protocols using carrier sensing, the amount of work on ALOHA improvements has been rather limited. The most notable improvement over basic ALOHA without requiring carrier sensing is slotted ALOHA, which divides time up into slot intervals, with each slot interval having sufficient time to send the maximum allowed size data packet and receive an ACK packet. A data packet transmission is attempted only at the beginning of a slot interval. Therefore, slotted ALOHA requires clock synchronization, and control plane packet traffic to achieve synchronization. The vast majority of improvements on ALOHA assumes slotted ALOHA. In addition, some improvements based on slotted ALOHA take advantage of channel-state information. These improvements require that receivers distinguish among idle, successful and unsuccessful time slots, use physical-layer mechanisms, and thus interact with Layer 1 protocols.

In various embodiments described herein, no clock synchronization among the nodes is required. Instead, transmission events are based on a transmission queue comprising a number of queue turns, with each different queue turn assigned to a different node 110 in the network 100. This is accomplished by including the one or more queue fields 250 in the data link (layer 2) header, as shown in FIG. 2A. In various illustrated embodiments, the queue fields 250 include a specific set of four queue fields. These specific fields are depicted in the control packet of FIG. 2B, as described above, including a queue size field 250a, a current turn field 250b, a data ending field 250c, and a newly added turn field 250d. These fields are designated herein as Q, E, D and A or A', respectively, where A designates a one-bit flag for a newly added turn, and A' designates the ID of the node to most recently join the queue, in various embodiments. In some embodiments, in which the fourth field 250d holds multi-bit data that indicates A' (a node ID of the most recent node to join the queue) the fields are designated S, P, N and A, respectively, and collectively called the SPAN fields.

Stating Q and E in each packet transmitted makes this approach more robust in the presence of physical-layer effects like fading, and also enables the use of such energy-saving steps as allowing nodes that are not in the queue to not monitor the channel. The D bit allows nodes to avoid having idle turns resulting from nodes choosing to leave the queue. The A bit provides robust feedback to nodes that attempt to join the transmission queue.

Figure 2C:
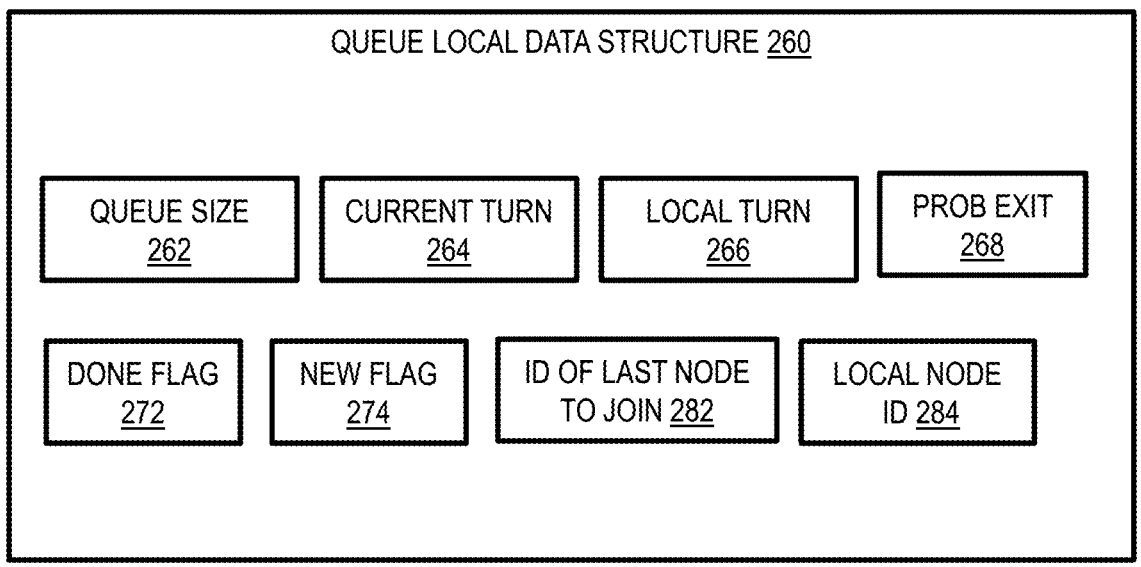
FIG. 2C is a block diagram that illustrates an example queue data structure stored on a local node, according to an embodiment.

Each QS module 150 on each node 110 in the network maintains a data structure, such as a table, in a non-transitory computer readable medium, to store information used in these fields. FIG. 2C is a block diagram that illustrates an example queue data structure 260 stored on a local node, according to an embodiment. The data structure 260 incudes a queue size field 262 that holds data that indicates a size of the transmission queue, in total number of turns in the queue, either derived locally or received on the communications channel in field 250a in a most recently received data packet 200 or control packet 201. In some embodiments, there is no limit on the queue size. In some embodiments, there is a maximum queue size indicated by variable qmax, which is set based on performance experience or to limit the length (number of bits) of the queue size field. The data structure also includes a current turn field 264 that holds data that indicates a current one of all the turns in the transmission queue, either derived locally or received on the communications channel in field 250b in a most recently received packet.

The data structure 260 incudes a local turn field 266 that holds data that indicates which of the turns in the transmission queue is the one turn during which the local node can transmit. This turn is determined during a join operation performed during a join state, as described in more detail below with reference to FIG. 3A and FIG. 3B. Before the local node joins the queue, the value indicated in the field 266 is a NULL value (e.g., 0 or a negative number).

The data structure 260 in the illustrated embodiment incudes a probability of exit field 268 that holds data that indicates a value for the probability that the local node will exit the queue even if the local node has another data packet to transmit. The value is indicted by the variable $P_{exit}$. In some embodiments, this value is a function of the queue size stored in field 262; and, in such embodiments, field 268 may be omitted.

The data structure 260 includes a done flag field 272 that holds data that indicates whether the next data packet transmitted from the local node is the last of the data packets to be transmitted, after which the local node will leave the queue. In some embodiments, the last data packet to be transmitted is based on an exit probability to prevent monopoly of the local node's transmit turn. This field can have a length of a single bit, with one value (e.g., 0 or FALSE or NULL) indicating the next transmitted data packet is NOT the last; and the other value (e.g., 1 or TRUE) indicating the next data packet transmitted is the last before leaving the queue.

In some embodiments, the data structure 260 also includes a new flag field 274 that holds data that indicates whether the value of the local turn in field 266 was just successfully established, so that the next data or control packet will announce to the other nodes on the channel that a new turn has been added to the queue. The variable A represents the data in this field.

In an embodiment that uses carrier sensing, as described in the Example Embodiments section, field 274 is omitted, and instead the data structure 260 includes a last node to join field 282 that holds data that indicates the identifier (ID) of the most recent node to join the queue, so that the next packet will announce to the other nodes on the channel that a new turn has been added to the queue for that particular node.

Also depicted in data structure 260 is local node ID field 284 that holds data that indicates the unique identifier for the local node. While depicted in data structure 260 for convenience, this identifier is conventionally known to the local node and may be stored in any conventional data structure.

In some embodiments, including the example carrier sensing embodiment described in the Example Embodiments section, the queue size shrinks with each node that relinquishes a turn; and, thus the next available turn is always the turn after the current queue size indicated in field 262. Such embodiments have an advantage of reducing unused (empty) turns and reducing the amount of information that is stored at each node.

The total size of data structure 260 is small and not a burden for most nodes 110. For example, allowing for a queue size of up to qmax=255 members, the queue size field, or current turn field 264, or local turn field 266 or probability of exit field involves only 8 bits each (8 bits is a single byte in many computer architectures), and the flag fields 272 and 274 involve only 1 bit each, and the node identifiers are typically one or two bytes each—for a total less than 66 bits (eight bytes and two bits).

Although data structures, messages and fields are depicted in FIG. 2A and FIG. 2B and FIG. 2C as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

The above structures enable a method described herein, which overcomes the limitations of ALOHA by allowing nodes to collaborate with each other at the data link layer (Layer 2), such as the MAC layer, to establish and maintain transmission queue sharing (QS).

2. METHOD FOR QUEUE SHARING (QS)

The method for queue sharing allows a local node to determine the size of the queue and the next available entry turn for entering the queue; and allows that local node to request to join the queue once in a persistence interval that follows all the turns currently in the queue. All the turns currently in the queue plus the persistence interval is called one queue cycle. After joining the queue, a local node may transmit when that local node's turn comes up in each queue cycle. To keep from monopolizing that turn, the local node will leave the queue after a number of turns. The local node is considered to be in one of four states: IDLE, BACKOFF, JOIN, and QUEUE, as described in more detail below. These states are further illustrated in terms of a state machine in an embodiment described in the Example Embodiment Section. In the following, unless otherwise stated, the terms incrementing and decrementing a variable refer to incrementing and decrementing, respectively, a variable value by one.

2.1 Shared Queue without Carrier Sensing

Figure 3A:
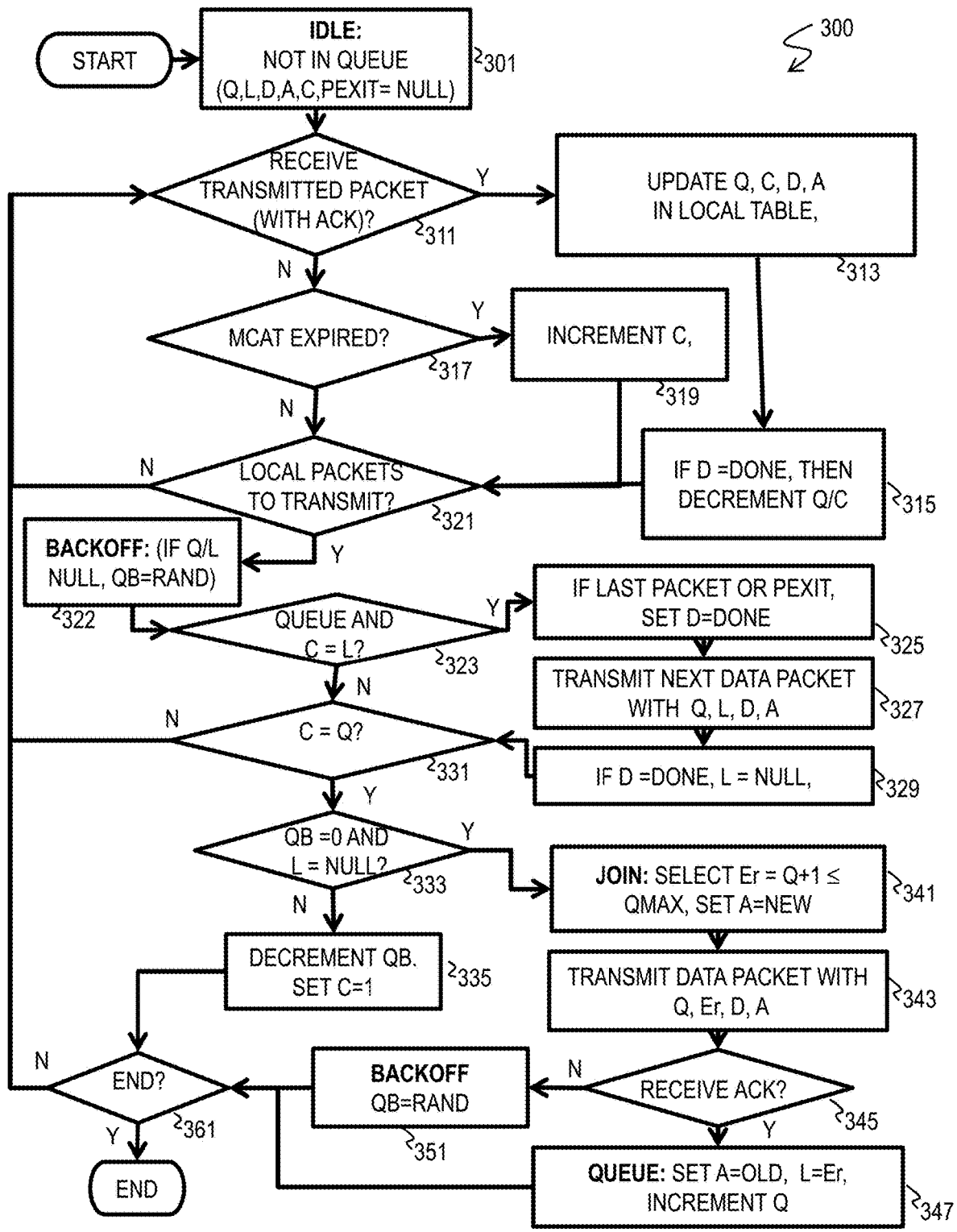
FIG. 3A is a flow chart that illustrates an example method for utilizing a channel using a shared transmission queue, according to an embodiment.

FIG. 3A is a flow chart that illustrates an example method 300 for utilizing a channel using a shared transmission queue, according to an embodiment. Although steps are depicted in FIG. 3A, and subsequent flow chart FIG. 3B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, when joining the network, e.g., by powering up or by moving within range, the local node is in an IDLE state and has not yet joined any queue. In the queue local data structure 260, values q, c, l, p, d, a for variables queue size (Q), a current turn (C), a requested queue turn for the local node (L), the probability of exit ($P_{exit}$), the done flag (D), and new turn acknowledgement flag (A) are set to NULL values (e.g., are set to zero or a negative number) in fields 262, 264, 266, 268, 272 and 274, respectively. In some embodiments, A' (not shown) replaces A and the field 282 is also set to a NULL value in step 301.

In step 311, it is determined whether a data packet transmitted by another node has been received, whether the data packet was directed to the local node or not. If so, then there is already an established queue and control passes to step 313 and following, described below, to obtain information about the established queue passed in the queue fields 250 of the data link (layer 2) header.

If not, then either an empty (and potentially available) turn is proceeding, or no queue has yet been established for this channel. In either case, control passes to step 317 to wait the maximum amount of time for a single turn (e.g., maximum channel access time, MCAT). In an illustrated embodiment MCAT is assumed to include the maximum receive-to-transmit turn-around time, the time needed to transmit the largest packet allowed, and a maximum propagation delay in the network. When the full empty turn has passed, control passes to step 319. In step 319, if the value c in variable C is not NULL, then c is incremented by one, because a turn has passed. If the value c in variable C is NULL, then it remains NULL in step 319. Control then passes to step 321. Note that no carrier sensing is employed. As a consequence of the lack of carrier sensing, the node is forced to wait a full maximum turn (e.g., MCAT) before the next turn can start. In embodiments that use carrier sensing with the shared queue, described in more detail below with reference to FIG. 3B, this wait time can be reduced, thus increasing bandwidth efficiency for the method.

Whether the empty turn has passed or not, it is determined in step 321 whether the local node has a data packet to transmit over the channel. If not, control passes to step 311 to wait for the next transmitted packet or empty turn or local packet. If so, i.e., if the local node does have a data packet to transmit, then the local node leaves the IDLE state and control passes to step 322 and beyond to establish a new queue if one does not already exist, or to join an existing queue, and once joined to transmit the next data packet from the local node during the proper turn in the queue.

It is most likely that a queue has already been established on the channel; and, thus it is most likely that a data packet transmitted by another node is received during step 311. If so, control passes to step 313. In step 313, values q, c, d, a in queue fields from the received data packet data link layer (layer 2) header fields 250a, 250b, 250c, 250d, respectively, are inserted into the local queue data structure 260 fields 262, 264, 272 and 274, respectively. The next available turn for the local node to use to enter the queue, called variable Er herein, is understood to be q+1. Then control passes to step 315.

In step 315, if the value d is not NULL, then this is the last data packet to be sent from the remote transmitting node, and that node will leave the queue. The queue is shrunk by setting Q=q−1 in queue size field 262 in the queue local data structure 260, and the current turn is also decremented by setting C=c−1 in current turn field 264 in the queue local data structure 260. Because the same is done by all other nodes receiving the data packet on the channel, the next transmitting node will use the new shrunk values for queue size q and current turn c. If the value of d is NULL, step 315 performs no function. In either case, control passes to step 321, to determine if the local node has one or more data packets to transmit.

If it is determined in step 321 that the local node does not have one or more data packets to transmit, then control passes back to step 311 and following, as described above. If, instead, there is a local data packet to transmit, then control passes to step 322. In some embodiments, the local node builds the data link (layer 2) header according to values currently in the queue local data structure 260 with field 250a set to the queue size value in field 262, field 250b set to the local turn 1 (or entry request turn Er) value in field 266, field 250c set to the done flag value in field 272, and field 250d set to the new turn acknowledged flag value in field 274. In some embodiments, step 322 further includes revising values in the fields 250 of the data packet header, for example, the values can be revised as described below with respect to steps 325 or 341. In such embodiments, steps 325 and/or 341 are not performed.

If in the IDLE state, then the node transitions from the IDLE state to the BACKOFF state, in which the local node waits until its turn in the queue comes up, or if it does not yet have a turn in the queue, the local node waits for a persistence interval in which it can attempt to join the queue. Thus, in step 322, if the value q or 1 in variables Q and L in fields 262 and 266 of the queue local data structure 260 is NULL, then there is no known queue or no turn for the local node in the queue, respectively. The node will back off for QB queue cycles. If 1=NULL, QB is chosen to be a random integer RAND, including zero. An advantage of choosing a random integer is that all nodes attempting to join the queue do not collide at the same persistence interval at the end of the same queue cycle. The time associated with this back off is RAND times the time for a queue cycle. If q is NULL, a new queue will be started; and, a queue cycle is assumed to be one turn time duration (e.g., MCAT). This can occur if the local node is the first node to join the queue. If q is not NULL, then a queue cycle is determined to be (q+1) times one turn time (e.g., (q+1)*MCAT) to account for the persistence interval. In step 322 the value for QB is set.

In step 323, it is determined if the local node is in the QUEUE state AND current turn c is the local node's turn 1. If so, then the local node can transmit the next data packet of the one or more data packets to transmit in steps 325 to 329, as described in more detail below. However, while still in the BACKOFF state, the local node is still waiting to join the queue and instead of passing to step 325, control passes to step 331.

In step 331, it is determined if the end of the queue cycle has been reached and the persistence interval has begun. This occurs if both the current turn c and the queue size q are equal (even if both are NULL). If both are NULL, then there is not a queue yet started and the local node should attempt to start the queue. If c does not equal q, then control passes back to step 311 and following steps to finish the current queue cycle.

In step 333, it is determined both if the local node does not yet have a turn, e.g., 1=NULL, and, if so, whether the local node waited enough time to request to join, e.g., whether QB, which is decremented each queue cycle, has reached zero. If both conditions are not satisfied, then control passes to step 335. In step 335, QB is decremented and the local node remains in the BACKOFF state. The next queue cycle begins; so, the value c of the current turn is set back to 1 by setting variable C=1. Control passes to step 361.

In step 361 it is determined whether some end condition is satisfied, such as powering down the local node or the node moving out of range of the shared channel. If so, the process ends. If not, control passes back to step 311 to wait for the next transmitted data packet to be received or empty turn to pass, in the next queue cycle, as described above.

If it is determined in step 333 that both conditions are satisfied, then control passes to step 341 and the local node transitions to the JOIN state—the local node is attempting to join (or start) the queue. Step 341 includes selecting an entry turn to request, designated Er. If queue size value q in field 262 is NULL, the queue is started by setting a requested queue size value Qr=1 and a requested entry turn Er=1.

If the queue size value q in field 262 is not NULL, then there is only one available entry turn Er=q+1 and there must also be a request to increase the queue size, i.e., Qr=q+1. The data packet header queue size field 250a is set to Qr=q+1 and data packet header turn field 250b is set to Er=q+1. The queue size q in field 262 of queue local data structure is not updated at this step, because the new turn has not yet been added successfully. (If zero is the NULL value, then even starting a new queue is equivalent to incrementing the queue size q in field 262, e.g., Qr=q+1).

In some embodiments, the queue size is limited to a maximum queue size, $q_{MAX}$. So, if q+1>$q_{MAX}$, then the state reverts to BACKOFF, e.g., steps 341, 343 and 345 are skipped (not shown) and control passes to step 351, described below. The local node will not be able to transmit until a remote node leaves the queue and its turn becomes available.

If the local node does not revert to the BACKOFF state, then, in step 341, the new turn acknowledgement flag A is set to not NULL, e.g., field 250d=a=1. This indicates the values in header fields 250a or 250b are requested additions to the queue. Control passes to step 343.

In step 343, the local node transmits the local data packet. The data link layer (layer 2) header of the local data packet includes queue field 250a that indicates the requested queue size (e.g., q+1 or q), and field 250b indicates the requested entry turn Er (e.g., =q+1), and field 250c indicates in the done flag that the transmission is not done (e.g., d=NULL), and field 250d indicates the new field acknowledgement flag is on (not NULL, e.g., a=1). The queue fields 250 for the local data packet being transmitted are either filled in step 341 or previously filled, e.g., in step 322 or 333 based on the rules described in step 341.

In step 345, it is determined whether transmission is successful. In some embodiments this is determined if an acknowledgement control packet is received within the allotted time that uniquely indicates the local data packet transmitted in step 343. In many embodiments, QEDA fields and normal packets are standard MAC packets. Then, only the node in the first queue position, or the nodes in the first and last queue positions, send a QEDA acknowledgement packet to state the success or failure of the join attempt in the last cycle; and, the rest of the nodes in the queue send only normal packets. If transmission is not successful, then the JOIN attempt was not successful; and control passes to step 351. In step 351, the local node returns to the BACKOFF state and QB is set to a new random value for a later attempt to join the queue. Control passes to step 361; and, as described above, if the process does not end, control passes back to step 311 and following steps. If it is determined in step 345 that the transmitted node was received successfully, then the queue has been updated with a turn for the local node and control passes to step 347.

In step 347, the local node enters the QUEUE state. The variable A is reset to the NULL value, because the next data packet sent by the local node will not be the first with the new local turn and new value, if any, for the queue size. The variable 1 for the local turn L in field 266 of the queue local data structure 260 is set to the requested value, i.e., 1=Er; and, the queue size field 262 in the queue local data structure 260 is updated to the requested queue size, i.e., Q holds a value for q=Qr. Control then passes to step 361 to determine if the process ends; and, if not, control passes back to step 311 and following. Thus, the local node has joined the queue.

After joining the queue, the local node is in the QUEUE state and the value 1 is not NULL. Then, in step 323, it may be determined that the current turn c, is equal to the local turn 1. If so, then control passes to step 325. In step 325 the done flag field in 272 in data structure 260, and in the local data packet header field 250c, is set to not NULL (e.g., d=1) if the local node will relinquish its turn after this transmission. This may be determined to occur when the last of the local data packets is about to be transmitted, or with a probability $P_{exit}$ set to ensure that no node monopolizes a turn in the queue, e.g., the local node is forced to relinquish the turn with a probability of 1%, or 1/q or some other value of $P_{exit}$, even if the local node has another local data packet to transmit.

In step 327, the next data packet is transmitted with current values q, 1, d and a in data packet fields 250a, 250b, 250c, 250d, respectively. This data packet is treated by the receiving nodes in the same way the local node would receive such a message. Control passes to step 329.

In step 329, after transmitting the data packet, if d is NULL, then step 329 performs no function. If d is not NULL, then the local node relinquishes its turn by setting the value 1 of the local turn field in 266 in data structure 260 to a NULL value—indicating the local node no longer has a local turn in the queue. The value of q is decremented in the queue size field 262 of queue local data structure 260.

2.2 Shared Queue with Carrier Sensing

Figure 3B:
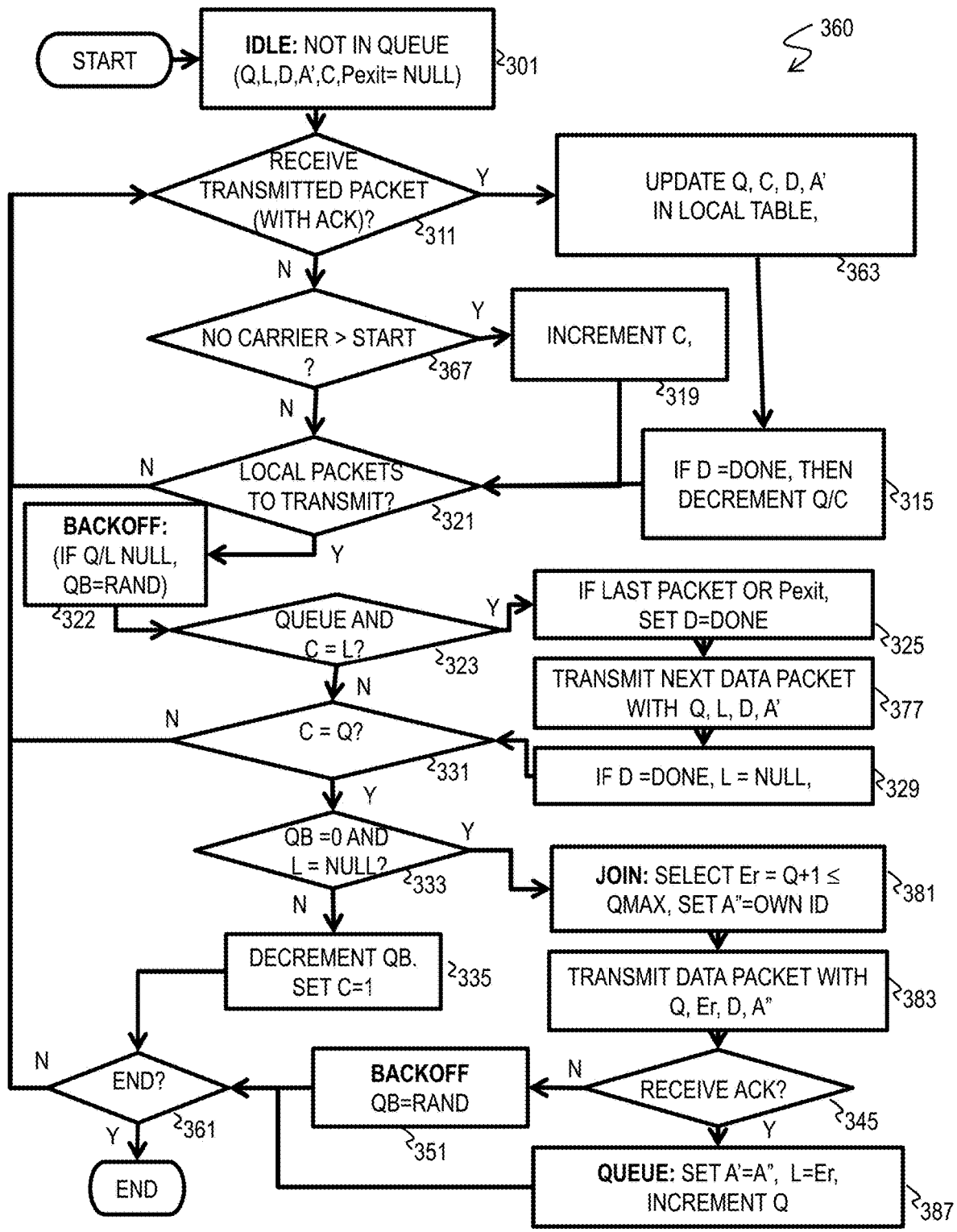
FIG. 3B is a flow chart that illustrates an example method for utilizing a channel using a shared transmission queue using carrier sensing, according to another embodiment.

FIG. 3B is a flow chart that illustrates an example method 360 for utilizing a channel using a shared transmission queue using carrier sensing, according to another embodiment. Steps 301, 311, 315, 319, 321, 322, 323, 325, 331, 333, 335, 345, 351 and 361 are as described above for FIG. 3A.

Steps 363, 377 in FIG. 3B correspond to steps 313, 327 in FIG. 3A but with A' (ID of most recent joining node)

replacing A (new member flag). This change affects steps 341 and 343 of FIG. 3A as indicted by corresponding new steps 381 and 383 in FIG. 3B. In step 381, a requested new turn Er is associated with a requested new node ID a" that indicates the ID of the local node. In some embodiments, step 381 is used in method 300 in place of step 341. In step 383, a join packet consists of a single control packet (no payload) with field 250d holding data that indicates a" in A' field 282. Step 347 in FIG. 3A is replaced by step 387 in FIG. 3B. In step 387, the field 282 in data structure 260 is set to the requested value a" that is the value of the ID of the local node.

The use of A' field 282 over A field 274 provides an advantage when starting a queue. The first successful request with Q=1 from any given node, e.g., node 110a, makes all other nodes adopt the successful node as the head of the queue and state in their join requests Qr=2, Er=2, D=0, and the identifier of the successful node 110a in field A'. Nodes other than node 110a (the head of the queue) transmit their own requests in between consecutive requests from node 110a (the head of the queue). Node 110a (the head of the queue) does not know that it (node 110a) was successful in starting the queue until a join request succeeds from a different node (e.g., node 110b) stating Qr=2, Er=2, D=0 and A' equal to its own identifier (the identifier for node 110a). Accordingly, in this embodiment, node 110a (the head of the queue) persists sending its join requests at random times until it hears an acknowledgment from the second node (110b) to join the queue through a successful request transmission.

New step 367 replaces step 317. In new step 367, instead of waiting a maximum time (e.g., MCAT) for one turn, carrier sensing is used to determine whether the channel is being used, and, if the channel is not being used, incrementing the current turn is done in step 319 more rapidly. For example, an empty channel can be detected if a carrier is not sensed within a fixed start time that includes a time for nodes to start transmitting or receiving, and the time needed to detect carrier by any given node. Typically, this start time is much less than MCAT. Step 367 offers the advantage of reducing delays and improving throughput, as will be demonstrated below, with respect to experimental embodiments.

3. EXAMPLE EMBODIMENTS

An example embodiment of the method 300 of FIG. 3A without carrier sensing but with variable A, a single bit to indicate a new addition to the queue, has been implemented and called the KALOHA-QS protocol and is described in more detail here.

An example embodiment of the method 301 of FIG. 3B with carrier sensing and streamlined join messaging using A' with the ID of the node that most recently joined the queue has been implemented and called Queue Sharing Multiple Access (QSMA), and is also described in more detail here.

Figure 4A:
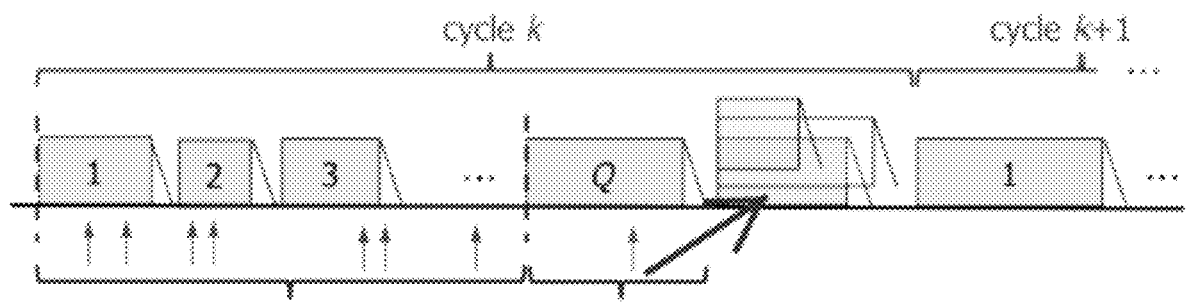
FIG. 4A through FIG. 4C are block diagrams that illustrates example timelines for channel utilization based on a shared transmission queue, according to an embodiment.
Figure 4B:
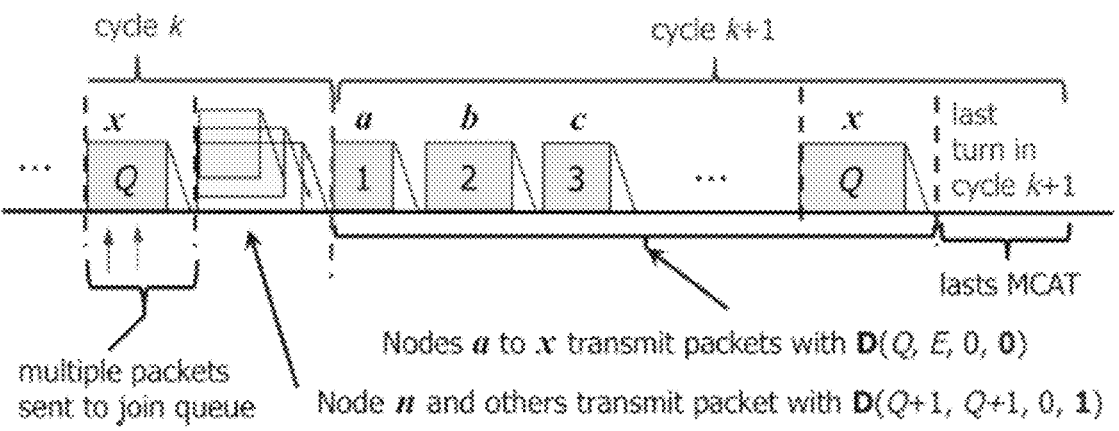
Figure 4C:
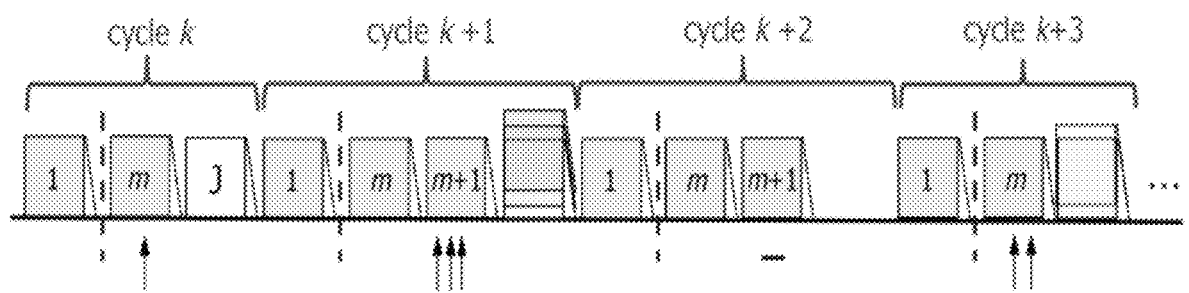

In both example embodiments, KALOHA-QS and QSMA, the queue grows with each node that adds a turn to the queue and shrinks with each node that relinquishes its turn in the queue. FIG. 4A through FIG. 4C are block diagrams that illustrates example timelines for channel utilization based on a shared transmission queue, according to an embodiment. In FIG. 4A through FIG. 4C time increases on the horizontal axis from left to right, and data packets are represented by rectangles above the time line that start at a certain time and followed by a ramp indicting transmission and receipt of an acknowledgement control packet. FIG. 4A depicts an existing queue with queue size Q greater than 3.

In this example, cycle k consists of Q queue turns followed by the request turn (during the persistence interval). Only those requests that arise during the last queue turn of the current queue cycle are allowed to take place during the request turn of the cycle together with backlogged requests from some prior cycles. All other requests to join the queue are scheduled for transmission at the end of randomly chosen queue cycles taking place in the future. During transmission of the last data packet in the queue, packet Q, nodes attempting to join the queue at the end of the current queue cycle, designated cycle k, prepare their data packets to transmit. These are nodes for which the random back off variable QB has reached zero. After the last acknowledgement control packet is received, the persistence interval begins, and those nodes transmit. If more than one transmits, as shown, no transmission is successful; and, the queue remains at size Q. Queue cycle k+1 begins with the node having the first turn transmitting its data packet.

FIG. 4B shows an example of failed attempts to join the transmission queue. Nodes a to x have already joined the transmission queue by queue cycle k and all of them continue being part of the queue past cycle k+1, which means that their packets state D=0. Multiple nodes including node n transmit during the request turn of cycle k to join the queue, which causes a collision. As a result, the nodes in the transmission queue must reset the ACK flag a=0 (or A'=x) and hence they all transmit packets stating a queue size of Q and A=0 or A'=x.

FIG. 4C illustrates the nature of channel utilization in KALOHA-QS. The figure shows cycle k having a queue with m turns and a single request to join the queue, which results in a success and hence cycle k+1 has m+1 nodes in the queue. Three requests to join the queue take place in cycle k+1, which results in a failure and cycle k+2 has again m+1 nodes in the queue. One node leaves the queue after transmitting and no requests to join the queue occur during cycle k+2, which results in cycle k+3 having m queue turns again. The example also shows two join requests occurring in cycle k+3, which results in a failure to increase the queue size.

3.1 KALOHA-QS Embodiment without Carrier Sensing

Figure 3C:
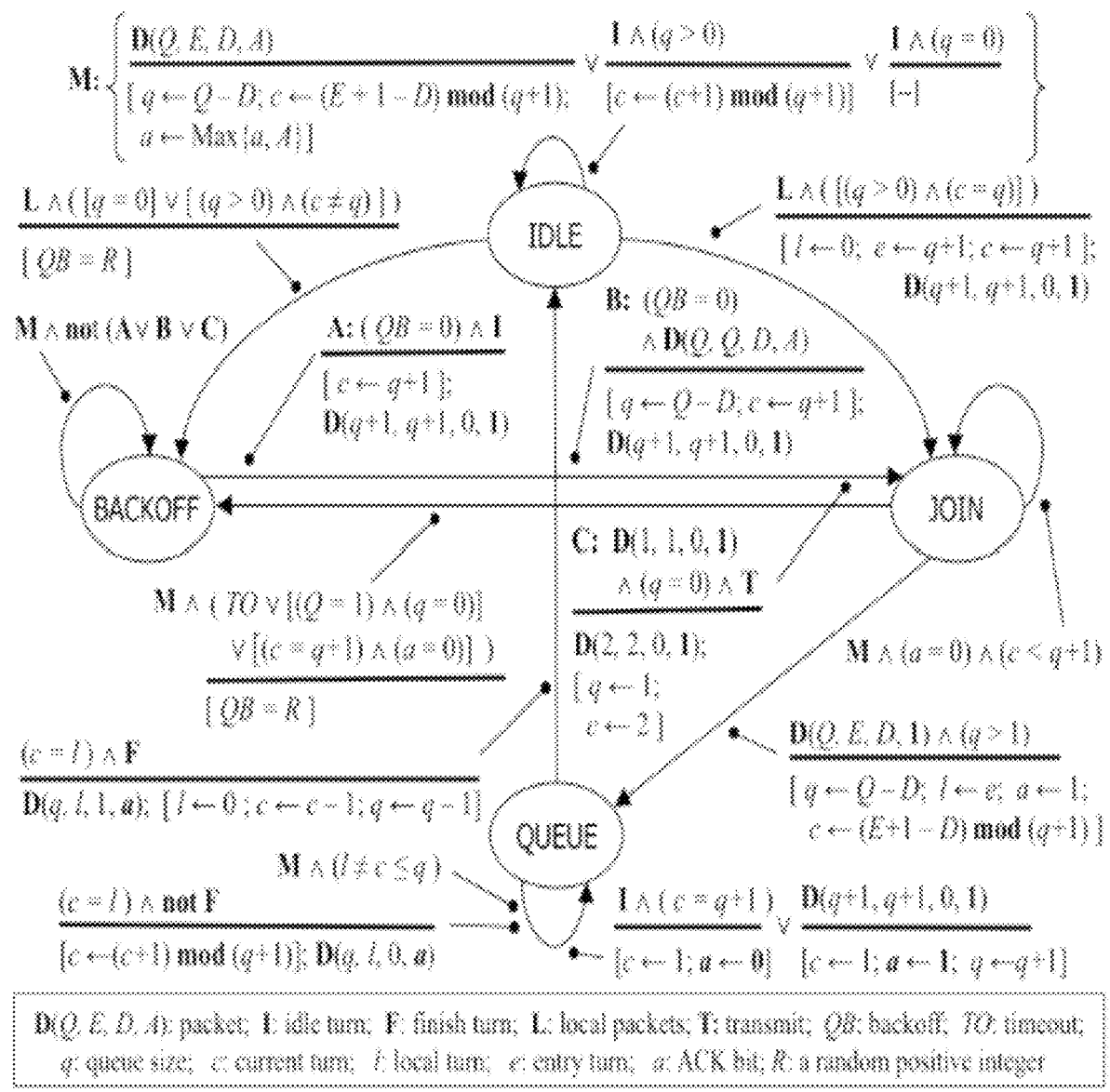
FIG. 3C is a block diagram that illustrates a state machine for queue sharing without carrier sensing, according to the KALOHA-QS embodiment.

FIG. 3C is a block diagram that illustrates a state machine for queue sharing without carrier sensing, according to the KALOHA-QS embodiment. Thus FIG. 3C is a specific embodiment of FIG. 3A. Each state transition specifies: (a) the event that causes the transition and the resulting update to the state of node, if any; and (b) the transmission by the node if there is any. KALOHA-QS has four states: IDLE, JOIN, BACKOFF, and QUEUE. In addition to the reception of packets, a node reacts to other types of input events when it transitions to or remains in one of those states, and events are indicated in bold font The state machine assumes that a node monitors the channel independently of whether or not the node has joined the transmission queue. Furthermore, all nodes experience the same channel conditions and no channel capture effects occur. Accordingly, a packet transmitted without MAI is either decoded correctly by all the nodes or by none of them, and no packet subject to MAI can be decoded.

A packet received or transmitted by a node is denoted by D(Q, E, D, A) and states the queue size Q, the turn of the transmitting node E, the data-ending bit D, and the join ACK bit A as perceived by the node that sends the packet.

The occurrence of a perceived idle period is denoted by I. If the transmission queue is not empty, such an idle period lasts one MCAT and may occur due to: a node in the transmission queue not transmitting during its turn, physical-layer effects affecting the reception of a transmitted packet, the occurrence of MAI on packets sent to join the queue at the end of a queue cycle, or the absence of requests at the end of a queue cycle. If the transmission queue is empty, the perceived idle period ends with the first packet received without MAI. The event that a node in the transmission queue is ready to finish its turn in the queue is denoted by F. The event that a node that is not in the transmission queue has obtained local packets ready for transmission is denoted by L. The event that a node in the BACKOFF state decides to transmit is denoted by T.

A node is initialized with the values $q=0$, $1=0$, $c=0$, $e=0$ and $a=0$; starts in the IDLE state; and remains in that state until it has local packets to transmit. A node that joins the transmission queue can transmit only at the beginning of its queue turn and must transmit at least one more packet stating that it is leaving the queue by setting the D bit to 1. A node that is not in the queue and has local packets to transmit can access the channel only after the last queue turn of the current cycle. All packets sent to join the transmission queue state $A=1$, and packets sent during a queue turn state $A=a$. The ACK flag is reset $a=0$ by nodes in the queue (i.e., in the QUEUE state) when no request is received correctly during the request turn of a cycle.

A node in the IDLE state monitors the activity in the channel and transitions to the JOIN or BACKOFF state depending on input events. A node is in the JOIN state when it is attempting to join the transmission queue. A node is in the BACKOFF state if it must wait to attempt to join the queue. A node is in the QUEUE state if it succeeded joining the transmission queue. The node activity that takes place in the four states in KALOHA-QS is somewhat similar to what occurs in ALOHA with priority ACK's, which can be viewed as KALOHA-QS with a zero-length transmission queue. More specifically: A node with nothing to send is in an idle state waiting for a packet to send; a node that transmits a packet waits for an ACK (as in the JOIN state); nodes that hear a data packet wait for the ACK to be transmitted (similar to the QUEUE state but without transmissions); and nodes that fail to receive ACK's for their transmitted packets enter the BACKOFF state.

IDLE State.

The set of steps taken by the node as a result of monitoring the reception of packets or perception of idle turns in the IDLE state is denoted by M in FIG. 3C. These monitoring steps consist of updating the size, q, of the queue, and the value, c, of the current turn, and the value, a, of the ACK flag, with each packet received. The node advances the current turn modulo $q+1$ even when idle turns occur. The same monitoring steps are also carried out by a node while in the other three states; this is indicated by M next to those states for brevity.

The ACK flag is set to 1 with the first packet received with $A=1$; hence, a node trying to join the transmission queue receives an ACK if its transmission succeeds and at least one transmission from nodes already in the queue is received in spite of physical-layer effects. If a node receives a packet with the D bit set, the node eliminates from the transmission queue the turn that just took place by reducing the size of the queue by one turn and by not incrementing the value of the current turn. If the D bit is not set the value of the queue size is unchanged and the current turn is incremented. This is shown in FIG. 3C by using the value of the D bit as an integer.

A node in the IDLE state that receives local packets to send when the transmission queue is empty or during a turn of a non-empty queue that is not the last transmission turn must transition to the BACKOFF state. In that case, the node computes a random integer R corresponding to the number of queue cycles for its queue backoff (QB). On the other hand, a node in the IDLE state transitions to the JOIN state if it receives local packets to send during the last turn of a nonempty transmission queue. Its packet states: $Q=q+1$ to indicate an additional turn, $E=q+1$ to request the last turn, $D=0$, and $A=1$. The node remembers the value of the requested transmission turn by setting $e=q+1$ and resets its local turn 1 to 0, where e corresponds to Er in FIG. 3A. FIG. 4A illustrates this aspect of the operation of KALOHA-QS. Only those nodes in the IDLE state that have arrivals in the last turn of the transmission queue can transmit packets after the last turn ends in order to join the queue. If the queue is empty, there is no last transmission turn in the queue and any node in IDLE state that obtains local packets to send transitions to the BACKOFF state. Requiring a backoff when the transmission queue is empty forces nodes to listen to the channel for a period of time that is long enough to detect packets transmitted without MAI.

JOIN State.

A node in the JOIN state remains in the JOIN state until it can transition to the QUEUE state or must transition to the BACKOFF state. If the node is attempting to start the transmission queue, it waits for positive feedback for a timeout interval TO that is longer than an MCAT. The node transitions to the QUEUE state if it receives a packet stating $Q>1$ and $A=1$, which indicates that its request packet was sent without MAI. The node transitions to the BACKOFF state if it obtains any of the following indications that its request was unsuccessful: (a) no node in the transmission queue transmits a packet stating $A=1$; (b) the node attempted to start the transmission queue and the TO to receive a packet from any other node expires; or (c) the node attempted to start the transmission queue and receives a packet stating $Q=E=1$, which indicates that its own packet was unsuccessful. FIG. 4B, described above, shows an example of a failed attempt to join a transmission queue.

If a node transitions to the QUEUE state, it updates the queue size q, and the current turn c in the same way as it does while in the IDLE state. In addition, it sets is local turn/to the turn value e (corresponding to Er in FIG. 3A) it proposed in its attempt to join the queue. If the node transitions from the JOIN state to the BACKOFF state, it sets its queue backoff QB to a positive random integer stating the number of queue cycles that the node will wait before attempting to join the queue again.

BACKOFF State.

A node in the BACKOFF state decrements the value of QB after each complete queue cycle occurs, and processes an input event carrying out the set of monitoring steps M while in the BACKOFF state.

A node remains in the BACKOFF state while $QB>0$ or $QB=0$ and the request turn of the current cycle has not been reached. The node transitions to the JOIN state when either: (a) $QB=0$ and the request turn of the current queue cycle is reached ($c=q+1$); or (b) the queue is empty, the node receives a packet $D(1; 1; 0; 1)$ starting the queue, and the node decides with some probability to try to join the queue (indicated by T in FIG. 3C). In the first case, the node updates the queue size q if needed, sets $c=q+1$ and transmits a packet indicating that it wants to occupy turn $q+1>0$ of the queue by stating $D(q+1; q+1; 0; 1)$. In the second case, the node updates $q=1$ and $c=2$, and transmits a packet $D(2; 2; 0; 1)$.

QUEUE State.

A node in the QUEUE state remains in that state until it receives a local signal to end its transmissions, which is denoted by event F in FIG. 3C. The node simply carries out the set of monitoring steps M after an input event when the current turn is not the last turn of the cycle and is not the queue turn of the node (1≠c≤q).

A node in the QUEUE state that does not receive a packet during the request turn of the current cycle sets c to 1 and resets its ACK flag a to 0. This is done to account for the start of a new queue cycle without a successful join request in the previous cycle. If the node receives a packet correctly during the request turn of the current cycle, the node increases the queue size by one, sets c to 1 and sets its ACK flag a to 1 to account for the start of a new cycle with a successful join request in the previous cycle. The handling of the ACK flag at the end of a queue cycle is illustrated in the example shown in FIG. 4B, described above.

While a node does not need to end its turn (event F is not true) and the current turn corresponds to the turn of the node (c=1), then the node increments the value of the current turn by one and transmits a data packet stating Q=q, E=1, D=0, and A=a. If a node needs to transmit its last packet (event F is true) and the queue turn of the node corresponds to the current turn (c=1), then the node transmits its last packet with the current values of the queue size and queue turn, ACK flag, and D=1 to announce its departure. The node then decrements by 1 the values of queue size and current queue turn and sets 1=0 to account for its own departure.

3.2 QSMA Embodiment with Carrier Sensing

Figure 3D:
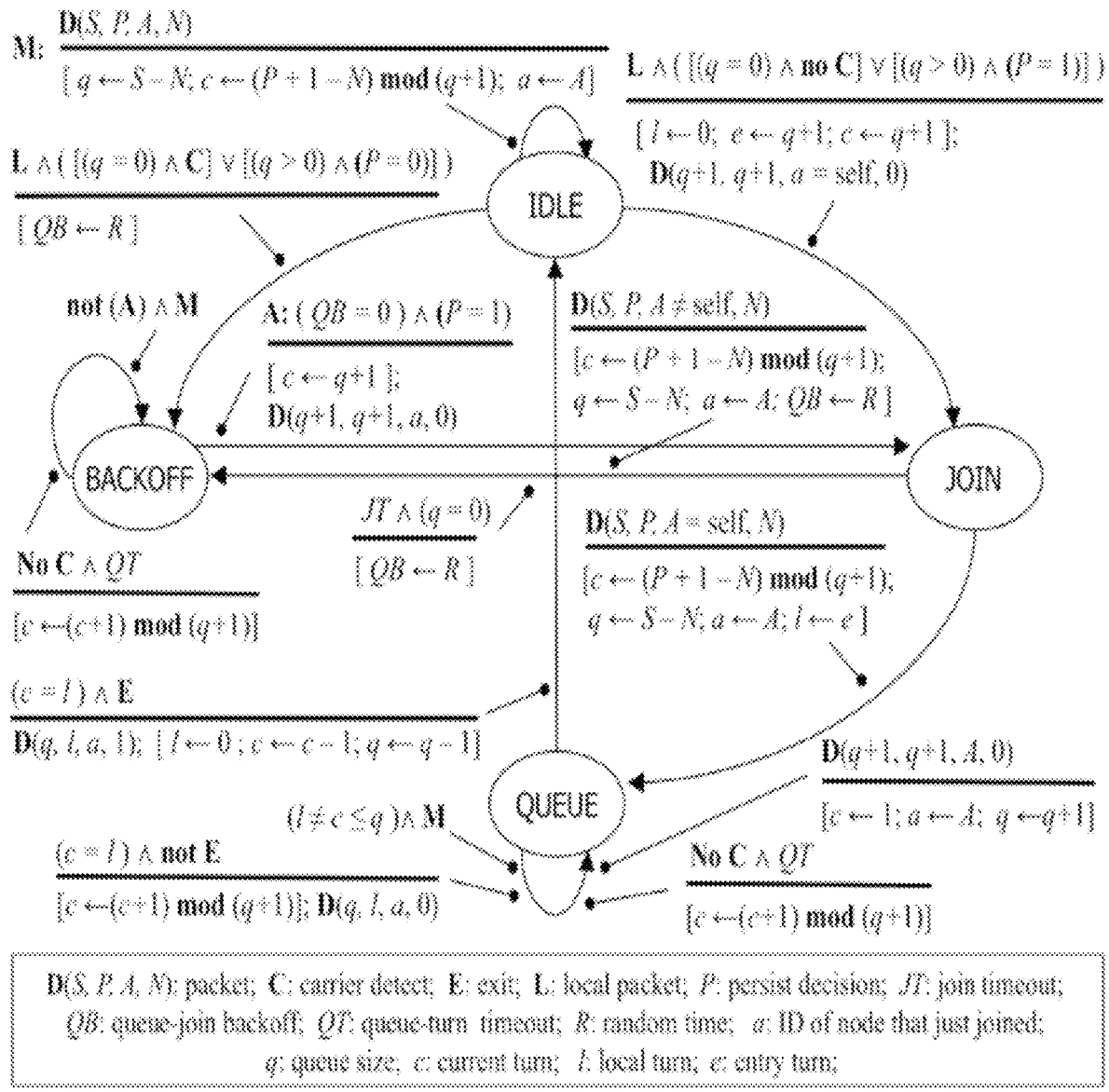
FIG. 3D is a block diagram that illustrates a state machine for queue sharing with carrier sensing, according to the QSMA embodiment.

FIG. 3D is a block diagram that illustrates a state machine for queue sharing with carrier sensing, according to the QSMA embodiment. Thus FIG. 3D is a specific embodiment of FIG. 3B. This state machine has the same four states as described above. Each state transition specifies: (a) the event that causes the transition and the resulting update to the state of node, if any; and (b) the transmission by the node if there is any.

A packet received or transmitted by a node is denoted by D(S, P, A, N) and states the queue size S (equivalent to field Q, above), the turn of the transmitting node P (equivalent to field E, above), the identifier A (an expansion of field A and equivalent to field A', above) of the node that occupies the last queue turn, and the data-ending bit N (equivalent to field D, above). A request to join the transmission queue is simply a packet with no payload. The occurrence of carrier detection by the node is denoted by event C, not to be confused with current turn c. The event that a node in the transmission queue is ready to exit the transmission queue is denoted by E not to be confused with the requested turn e. The event that a node that is not in the transmission queue needs to join the queue is denoted by L, not to be confused with the local node's actual turn in the queue designated 1. A new persistence parameter Persist is introduced, represented by the letter P in FIG. 3D, not to be confused with the field P for the turn of the local node. A node is initialized to start in the IDLE state with the values q=0, 1=0, c=0, e=0, $P_{exit}$=0, and Persist=0, and A' value a set to an invalid identifier as a NULL value. A node remains in the IDLE state as long as it has no need to join the transmission queue; and, while IDLE, simply monitors the activity in the channel. The states have the same general purpose as described above and differ in only some implementation details that provide one or more advantages in achieving high throughput, as described below.

According to the persistence strategy for the QSMA embodiment, if a node is ready to join the transmission queue during the last seconds (designated p) of the queue turns of the current queue cycle, the node is allowed to persist with its request and sets Persist=1, and sets Persist=0 otherwise.

IDLE State.

The set of steps taken by the local node in this state are as described above for FIG. 3C, but with the field N in place of the field D, for the end of a transmission set of packets. In addition, unlike in FIG. 3C, the Persist parameter is used. Thus, a node in the IDLE state that needs to join the transmission queue transitions to the BACKOFF state if the queue is empty and the node detects carrier or the queue is not empty and the node is not allowed to persist with its join request (Persist, P in FIG. 3D, =0). On the other hand, a node in the IDLE state that needs to join the queue transitions to the JOIN state if the queue is not empty and the node is allowed to persist with its join request (Persist=1). In FIG. 3D, fields S, P and N stand in for fields Q, E and D, respectively, as described above for FIG. 3C. In contrast to FIG. 3C, in FIG. 3D, A' replaces A and A'=self (its own identifier). As in FIG. 3C, the node remembers the value of the requested transmission turn by setting e=q+1 and resets its local turn 1 to 0. While A' is larger than a single bit flag that can be used as A, in many embodiments, the use of A' allows the join request packet to be a control packet instead of a data packet. Thus, a difference between the state machines is the use of short, control-plane, join request packets in FIG. 3D instead of the use of large data packets for a join request in FIG. 3C.

JOIN State.

As in FIG. 3C, a node in the JOIN state waits for a packet to acknowledge its join request. The node transitions to the BACKOFF state if either the queue is empty and no packet is received within a join timeout (JT) interval, as in FIG. 3C, or, unlike FIG. 3C, a packet is received that does not state the identifier of the node in the acknowledgment field A'. As in FIG. 3C, the node computes a random time R as a queue-join backoff after updating its local variables as needed. Unlike in FIG. 3C, the node in FIG. 3D transitions to the QUEUE state if it receives a packet that acknowledges its request by having the field A' indicate the identifier of the node. Like in FIG. 3C, in response, the local node updates the queue size q, and the current turn c in the same way as it does while in the IDLE state. In addition, it sets its local turn/to the turn value e it proposed in its attempt to join the queue.

BACKOFF State.

As in FIG. 3C, a node in the BACKOFF state waits until its QB expires and processes packets and idle periods while in the BACKOFF state. Unlike FIG. 3C, the node transitions to the JOIN state if its queue join backoff expires and it is allowed to persist with its request (Persist (P)=1). In that case, the node updates the current queue turn to equal q+1 and sends a join request D(q+1,q+1, a', 0). The node rejoins the BACKOFF state if its queue-join backoff expires and it is not allowed to persist with its request (Persist (P)=0).

QUEUE State.

As in FIG. 3C, a node in the QUEUE state remains in that state until it receives a local signal to exit the transmission queue, which is denoted by event E in FIG. 3D. While the current queue turn does not correspond to its own queue turn (i.e., 1≠c≤q), the node simply processes packets as indicated by event M in FIG. 3D, or advances the current queue turn after a missing packet. Unlike in FIG. 3C, in FIG. 3D, the current queue turn is advanced without waiting for a full queue turn by, instead, detecting no carrier for a period of time (queue-turn timeout or QT) that is long enough for nodes to determine that the queue turn is empty. A node transmits a packet D(q, l, a', 0) if it remains in the transmission queue, and transmits a packet D(q, l, a', 1) to exit the transmission queue. In the latter case the node transitions to the IDLE state after reducing the queue size, updating the current queue turn, and re-setting its position in the queue to 0.

3.3 Derivations that Quantify the Example Embodiments

The efficacy and efficiency of the above approaches is demonstrated with the following derivations, for the purposes of explanation. However, the embodiments are not limited by the accuracy or completeness of the following derivations.

A traffic model first introduced by Abramson 1970 is used here to analyze and compare the various approaches. A large number of nodes send requests to join the transmission queue with an aggregate mean rate of $\lambda$ packets per unit time and constitute a Poisson source in the aggregate. A node that is forced to backoff as part of the transmission policy does so for a random time in a way that transmissions for new arrivals and backlogged arrivals can be assumed to be independent of one another, and the system operates in steady state with no possibility of collapse. Processing delays are negligible, the physical layer introduces no errors, and any packet propagates to all nodes with the same propagation delay $\tau$. Hence, transmissions that overlap in time are the only source of errors. All data packets are of equal length $\delta$ and a join request packet has length $\gamma$. A fixed turn-around time $\omega$ is assumed for nodes to start transmitting or receiving, and the time needed to detect carrier by any given node is $\xi$. It is further assumed that nodes that join the transmission queue stay in the queue waiting for the queue size to reach a target value m. Once the queue size is m+1, nodes follow a first-in, first-out (FIFO) discipline in which the node that has spent the most time in the queue leaves the queue during a given cycle with probability $P_{exit}$. In addition, the time that a node waiting to join the transmission queue is allowed to persist with its transmission equals the last $\delta$ seconds of the current queue period k.

Given that transmission queue sharing establishes transmission cycles consisting of queue turns followed by a join request turn, its throughput can be stated as a function of the average size of the transmission queue $\bar{Q}$ and the length of each queue turn and join request turn. The following theorem states this result assuming that each queue turn or join request turn lasts T time units that are shared among all nodes, such as seconds.

Theorem 1.

The throughput of QSMA (with carrier sensing) designated $S_{CS}$ is given by Equation 1a.

$$S_{CS} = \frac{\bar{U}}{\bar{C}} = \frac{\delta\mu\bar{Q}}{[\omega+\tau+\xi+(\delta-\xi)\mu]\bar{Q}+\omega+\tau+\gamma-(\gamma-\xi)e^{-\lambda\delta}} \quad (1a)$$

where $\mu$ is the probability that a node transmits a packet during its queue turn and $\bar{Q}$ is the average size of the transmission queue and the over variables are defined above. $\bar{U}$ is the time spent transmitting packets; and, $\bar{C}$ is the time of an average queue cycle.

Proof.

The throughput of QSMA is defined as the ratio of the time $\bar{U}$ spent transmitting packets without MAI in an average queue cycle, divided by the time $\bar{C}$ of an average queue cycle. Each queue turn of a cycle contains a successful packet with probability $\mu$ lasting $\delta$ time units; therefore, $$\bar{U}=\mu\delta\bar{Q} \quad (1b)$$

The value of $\bar{C}$ depends on the average queue size and the average length of the join turns that occur in each cycle. Based on the strategy described above for advancing a turn when carrier sensing detects no transmission, a join request turn with at least one join request lasts $\omega+\tau+\gamma$, while an empty join turn lasts only $\omega+\tau+\xi$. The probability of having an empty join request turn equals the probability of no requests arriving for transmission in the last $\delta$ of the queue period. Given that the arrivals of join requests is Poisson with parameter $\lambda$, this probability is $e^{-\lambda\delta}$. Therefore, the average duration of a join turn IS GIVEN BY $$\bar{J}=\omega+\tau+\gamma+\xi e^{-\lambda\delta}+\gamma(1-e^{-\lambda\delta}). \quad (1c)$$

Similarly, a queue turn has a transmission with probability $\mu$, in which case it lasts $\omega+\tau+\delta$, and lasts only $\omega+\tau+\xi$ when it is empty. Therefore, the average duration of a queue turn is $$\bar{T}=\omega+\tau+(1-\mu)\xi+\mu\delta \quad (1d)$$

The duration of an average queue cycle is then $$\bar{C}=\bar{Q}\bar{T}+\bar{J} \quad (1e)$$

Equation 1a is obtained by substituting $\bar{U}$ from Equations 1b into the numerator of Equation 1a; and substituting Equations 1c and 1d into Equation 1e and the result $\bar{C}$ into the denominator of Equation 1a.

Theorem 2.

The throughput of KALOHA-QS (without carrier sensing) designated $S_{NCS}$ is given by Equation 2a.

$$S_{NCS} = \frac{\delta\mu\bar{Q}}{[\omega+\tau+\delta]\bar{Q}+\omega+\tau+\gamma} \quad (2a)$$

Proof.

In this case, the duration of a queue turn is the same whether or not it is used for a transmission, because nodes must defer for MCAT without the benefit of sensing that transmissions are taking place. The same applies for a join request turn. Thus $\bar{U}$ is the same as Equation 1b, but $\bar{J}$ is given by Equation 2b and $\bar{T}$ by Equation 2c.

$$\bar{J}=\omega+\tau+\gamma \quad (2b)$$

$$\bar{T}=\omega+\tau+\delta \quad (2c)$$

Substituting these into Equation 1e, gives $\bar{C}$ as Equation 3, the denominator for Equation 2a.

$$\bar{C}=\bar{Q}\bar{T}+\bar{J}=\bar{Q}(\omega+\tau+\delta)+\omega+\tau+\gamma \quad (3)$$

Thus Theorem 2 is proved.

Theorem 3.

The average queue size in QSMA is given by Equation 4.

$$\bar{Q} = m + \frac{P_S(1-Pexit)}{Pexit-P_S} \text{ with } P_S < Pexit \quad (4)$$

Where m is the target queue size, $P_{exit}$ is the probability that the first node that joined the queue leaves in a given queue cycle, and $P_S$ is the probability of successfully joining during the join request turn of a queue cycle.

Proof.

Given that the system is assumed to operate in equilibrium, the size of the queue must drift to m as successes to join the queue take place within a finite period of time. Once the queue size is m, nodes may join and leave the queue with some probability, but the queue size must return to any given size m+k with k=0, 1, . . . . The average size of the queue $\bar{Q}$ equals m+$\bar{\upsilon}$, where $\bar{\upsilon}$ is the average number of queue turns in addition to m. For a given $P_{exit}$, as m+k increases, more nodes will leave the queue until there is a steady state with the number of nodes leaving equaling the number of nodes joining. As the demand for joining rises or falls, the value of m+k in balance rises or falls. For a steady state demand, the value of m+k approaches m+$\bar{\upsilon}$.

The value of $\bar{\upsilon}$ can be obtained using a homogeneous Markov chain whose states represent the number of nodes in the transmission queue once the transmission queue has grown to include at least m nodes. The probability of growing the queue size from m+k to m+k+1 and the probability of reducing the queue size from m+k to m+k−1 are independent of the number of nodes in the transmission queue, m+k, with k=0, 1, 2 . . . . Let $\pi_k$ (k=0, 1, 2, . . . ) denote the stationary probability that there are m+k nodes in the transmission queue in a given queue cycle.

The probability of increasing the queue size by one in a cycle is denoted by g and the probability of reducing the queue size by one in a cycle is denoted by r. Equation 5a and 5b gives the balance equations for such a Markov chain.

$$g\pi_0 = r\pi_1 \tag{5a}$$

$$(r+g)\pi_k = g\pi_{k-1} + r\pi_{k+1} \text{ for } k=1,2,\ldots \tag{5b}$$

This leads to Equation 6 by iteration and induction.

$$\pi_k = \pi_0 (g/r)^k \text{ for } k=1,2,\ldots \tag{6}$$

In the steady state, the queue size has at least m nodes in any given cycle, so Equation 7 holds.

$$\pi_0 + \pi_1 + \ldots + \pi_k + \ldots = 1 \tag{7}$$

Substituting Equation 6 into Equation 7 yields Equation 8.

$$1 = \pi_0 + \sum_{i=1}^{\infty} \pi_i = \left[1 + \sum_{i=1}^{\infty}\left(\frac{g}{r}\right)^i\right]\pi_0 \tag{8}$$

For the system to be at equilibrium, g<r. Defining ρ=g/r, means ρ<1. Solving Equation 8 for $\pi_0$ and substituting ρ for g/r, yields Equation 9.

$$\pi_0 = \left[1 + \sum_{i=1}^{\infty}(\rho)^i\right]^{-1} = 1 - \rho \tag{9}$$

Substituting Equation 9 into Equation 6 yields Equation 10.

$$\pi_k = (1-\rho)(\rho)^k \text{ for } k=1,2,\ldots \text{ with } 0<\rho<1 \tag{10}$$

The average size of the transmission queue is then given by Equations 11a through 11c.

$$\bar{Q} = m + \sum_{i=0}^{\infty} i\pi_i \tag{11a}$$

$$\bar{Q} = m + \rho \sum_{i=0}^{\infty} i(1-\rho)\rho^{i-1} \tag{11b}$$

$$\bar{Q} = m + \frac{\rho}{1-\rho} \text{ with } 0 < \rho < 1 \tag{11c}$$

The variables g and r are related to probabilities $P_{exit}$ and $P_S$ as given by Equations 12a through 12c.

$$g = P_S(1-P_{exit}) \tag{12a}$$

$$r = (1-P_S)P_{exit} \tag{12b}$$

$$P_S < P_{exit} \tag{12c}$$

Substituting Equations 12a and 12b into Equation 11c, where ρ=g/r, and rearranging terms proves the Theorem 3 expressed by Equation 4.

The average size of the transmission queue is then given by Equations 11a through 11c.

Corollary 4.

For a Poisson distributed arrival of join request with parameter λ, the average queue size in QSMA is given by Equation 13.

$$\bar{Q} = m + \frac{\lambda\delta e^{-\lambda\delta}(1-Pexit)}{Pexit - \lambda\delta e^{-\lambda\delta}} \text{ with } \lambda\delta e^{-\lambda\delta} < Pexit \tag{13}$$

Proof.

A large number of stations that constitute a Poisson source send data packets to the channel with an aggregate mean generation rate of λ packets per unit time. Join requests distributed as given by a Poisson distribution with parameter λ succeeds with probability $P_S = \lambda\delta e^{-\lambda\delta}$. Substituting this value into Equation 4, yields Equation 13 and proves the corollary.

The previous results on the average queue size are independent of the use of carrier sensing. This is a direct consequence of the approach chosen to use for persistence as part of the queue-join strategy. More specifically, the success of a join turn is determined solely by the arrival of join requests during the last δ seconds of the queue period of a cycle, which is a process that does not depend on carrier sensing.

Delays

It is also possible to estimate the delay in reaching the steady state target queue size, m. When the queue size q is less than the target size m, q represents the state of a Markov chain used to model queue growth to size m. The time it takes to reach that size is called the delay to steady state.

The probability of transitioning from state q=1 to state q=2 is denoted by $P_1$. The average time spent in that transition is denoted by $C_1(s)$. On the other hand, the probability of transitioning from state 1 back to state 1 is 1−$P_1$, and the average time spent in that transition is denoted by $C_1(f)$. The probability of transitioning from state q to state q+1 is the same for 2≤q≤m and is denoted by $P_s$, and the probability of transitioning from state q back to state q is 1−$P_s$. The average time spent in the transition from state q to state q+1 is denoted by Cq(s), and the average time spent in the transition from state q back to state q is denoted by Cq(f). The following theorem provides the average delay reaching a target queue size m assuming that carrier sensing is used and the carrier detect time is negligible (ξ=0).

Theorem 5.

The average delay, $\bar{D}$, in reaching a target queue size m in QSMA with carrier sensing and a probability μ that a node transmits during its queue turn is given by Equations 14a through 14c, in which R is an average random time used between the retransmissions of join requests by the same node. For example, in some embodiments, R the average number of backoff MCATs incurred between consecutive transmissions of request packets is R as stated in the paper.

$$\bar{D}(m) = \frac{1}{\lambda} + \left(e^{\lambda(\omega+\tau)} - 1\right)R + (\omega + \tau + \gamma)\left(e^{\lambda(\omega+\tau)} + 1\right) + \quad (14a)$$

$$(m-2)\left[s + f\left(\frac{e^{\lambda\delta}}{\lambda\delta} - 1\right)\right] + \left(\frac{m(m-1)}{2} - 1\right)\frac{e^{\lambda\delta}}{\lambda\delta}(\omega + \tau + \mu\delta)$$

$$s = \omega + \tau + \gamma\lambda\delta e^{-\lambda\delta} \quad (14b)$$

$$f = \omega + \tau + \left[1 - (1+\lambda\delta)e^{-\lambda\delta}\right]\gamma \quad (14c)$$

Proof.

Given that the system is in equilibrium, there must be a first join request transmitted without MAI with probability 1. To grow the queue to two turns, a second node must succeed transmitting its request without interference from any other node trying to join the queue. Hence, $P_1$ equals the probability that a request packet is sent successfully. Given that carrier sensing is used, and nodes are deaf while they turn from receive to transmit mode, Equation 15a follows.

$$P_1 = e^{-\lambda(\omega+\tau)} \quad (15a)$$

The average time elapsed between the first and the second successful request packet equals the average interarrival time of requests transmitted by nodes, given that no queue is established until the second request succeeds. In the example embodiment, the arrival process of requests is Poisson with parameter $\lambda$, and hence the average elapsed time between two successful requests is $1/\lambda$. Given that each request takes $\omega+\tau+\gamma$ seconds yields Equation 15b.

$$C_1(s) = 1/\lambda + 2(\omega+\tau+\gamma) \quad (15b)$$

The average time elapsed in a transition from state 1 back to state 1 is the average time between the transmission of request packets by the head of the queue according to the bootstrapping strategy. Given that an average random time R is used between the retransmissions of requests by the same node until a second request succeeds to acknowledge the head of the queue, the result is Equation 16.

$$C_1(f) = R + \omega + \tau + \gamma \quad (16)$$

The transition from state q to state q+1 ($2 \leq q \leq m-1$) involves only a single request to be transmitted during the request turn of a queue cycle. Given that the persistence interval during a queue cycle is $\delta$ seconds, it follows that the transition probability from state q to state q+1 for $2 \leq q \leq m-1$ equals $P_S = \lambda\delta e^{-\lambda\delta}$. A queue cycle in state q incurs q queue turns, and a request turn lasts $\omega+\tau+\gamma$ for a successful request. The result is expressed in Equation 17a and 17b.

$$C_q(s) = qT + \omega + \tau + \gamma\lambda\delta e^{-\lambda\delta} \quad (17a)$$

$$T = \omega + \tau + \mu\delta \quad (17b)$$

where T is the average length of a queue turn and for $\xi=0$.

The transition from state q to back to state q ($2 \leq q \leq m-1$) involves q queue turns and occurs if no request is sent or multiple requests are transmitted during the request turn of the cycle. No request is sent in a request turn with probability $e^{-\lambda\delta}$ and the request turn lasts $\omega+\tau+\xi$ seconds in that case. Similarly, multiple requests are sent in a request turn with probability $1 - e^{-\lambda\delta} - \lambda\delta e^{-\lambda\delta}$ and the request turn lasts $\omega+\tau+\gamma$ seconds in that case. The result is expressed in Equation 18.

$$C_q(f) = qT + \omega + \tau + \xi e^{-\lambda\delta} + \gamma[1-(1+\lambda\delta)e^{-\lambda\delta}] \quad (18)$$

The success of a request to join the queue is independent of any other request. Accordingly, the average delay incurred in growing the queue size to in starting from state 1 can be obtained from the following Equations 19 through 21.

$$\overline{D_1} = P_1[C_1(s) + \overline{D_2}] + (1-P_1)[C_1(f) + \overline{D_1}] \quad (19)$$

$$\overline{D_q} = P_S[C_q(s) + \overline{D_{q+1}}] + (1-P_S)[C_q(f) + \overline{D_q}] \quad 2 \leq q \leq m-2 \quad (20)$$

$$\overline{D_{m-1}} = P_S[C_{m-1}(s)] + (1-P_S)[C_{m-1}(f) + \overline{D_{m-1}}] \quad (21)$$

Solving Equation 19 for $\overline{D_1}$ and substituting the values of $P_1$, $C_1(s)$, and $C_1(f)$ from Equation 15a, 15b and 16, gives Equation 22.

$$\overline{D_1} = \frac{1}{\lambda} + \left(e^{\lambda(\omega+\tau)} - 1\right)R + \left(e^{\lambda(\omega+\tau)} + 1\right)(\omega + \tau + \gamma) + \overline{D_2} \quad (22)$$

Solving Equations 20 and 21 for $\overline{D_2}$ gives Equation 23.

$$\overline{D_2} = (m-2)\left[s + f\left(\frac{e^{\lambda\delta}}{\lambda\delta} - 1\right)\right] + \left[\frac{m(m-1)}{2} - 1\right]\frac{e^{\lambda\delta}}{\lambda\delta}(\omega + \tau + \mu\delta) \quad (23)$$

The Theorem is proved by substituting Equation 23 for $\overline{D_2}$ into Equation 22.

3.4 Improved Performance of Example Embodiments

In this section, some simplifying assumptions are made in order to facilitate simulation performance and comparing the performance to that formerly simulated for a prior art, non-CSMA layer 2 protocol called ALOHA. One assumption is that there is a large number of stations that constitute a Poisson source, sending data packets to the channel with an aggregate mean generation rate of $\lambda$ packets per unit time. A node that is forced to back off as part of the transmission policy of the MAC protocol does so for a random amount of time that is much larger than the time needed for a successful packet transmission and such that packet transmissions for new arrivals and backlogged arrivals can be assumed to be independent of one another. Multiple access interference (MAI) is the only source of errors, multiple concurrent transmissions to the common channel must all be re-transmitted, and any packet propagates to all nodes with the same propagation delay. The only physical layer feedback is the decoding of packets received without MAI. The system operates in steady state, with no possibility of collapse.

Requests to join the transmission queue occur with an aggregate mean rate of $\lambda$ packets per unit time. Nodes that join the transmission queue are assumed to stay in the queue until the queue size reaches a target value m. Once the queue size is at or over m+1, nodes follow a first-in, first-out (FIFO) discipline in which the node that has spent the most time in the queue leaves the queue during a given cycle with probability $P_{exit}$. A fixed turn-around time of w seconds is assumed for transitions from receive-to-transmit or transmit-to-receive modes. It is assumed in these experiments that the time, $\xi$, to detect a carrier is zero. This allows comparison to published results for a prior art approach. Results are normalized to the length of a data packet by making $\delta=1$ or $T=1$. We use $G=\lambda \times T$ to address the impact of queue size and the average delays reaching a target queue size, and $G=\lambda_d \times \delta$ to address the impact of signaling overhead, where $\lambda_d$ is the arrival rate of all packets used as parameter A. In addition, the normalized value of each other variable, which equals its ratio with δ or T is used as convenient.

Figure 5:
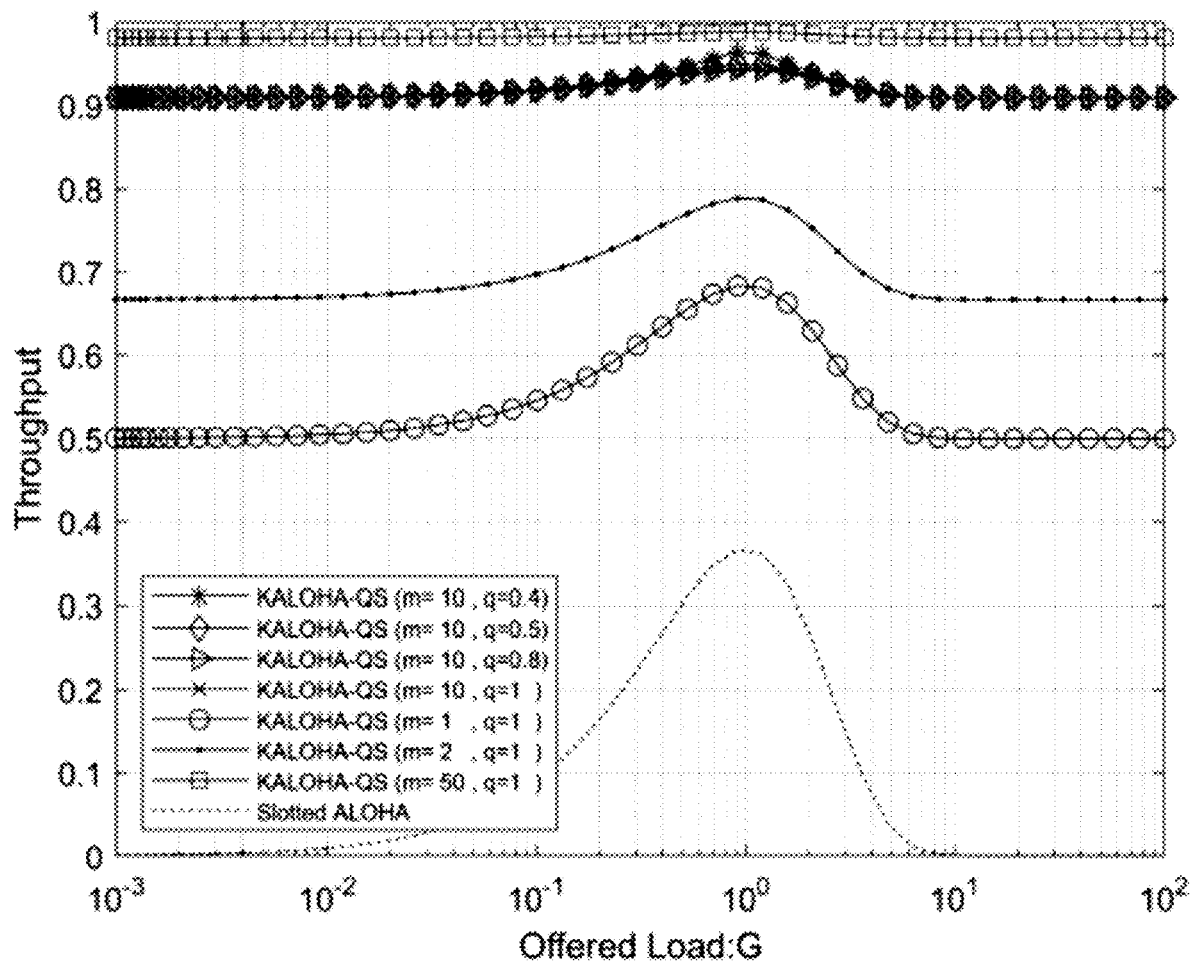
FIG. 5 is a plot that illustrates example throughput for slotted ALOHA and the throughput of queue sharing without carrier sensing for different target queue sizes and probabilities of leaving the queue, according to an embodiment.

FIG. 5 is a plot that illustrates example throughput for prior art "slotted ALOHA," and the throughput of KALOHA-QS for different target sizes and probabilities of leaving the queue, according to an embodiment. Slotted ALOHA throughput is the same as in KALOHA-QS with 0 queue size. The horizontal axis indicates offered load, G on a log scale; and the vertical axis indicates throughput on a linear scale, both dimensionless. KALOHA-QS is compared with slotted ALOHA (dashed line) without considering the effect of propagation delays and signaling overhead. For this purpose, the throughput result for slotted ALOHA (i.e., $Ge^{-G}$) and equations with T (duration of a successful transmission turn)=δ(duration of a packet), and μ (the probability that a node transmits a packet during its queue turn)=1. Results are shown as separate traces for values of m (target queue size) equal to 1, 2, 10, and 50, while the queue departure probability $P_{exit}$ (called q in the plot) is 1, and for $P_{exit}$ being equal to 0.4, 0.5, 0.8, and 1 while m is 10. The results also indicate that the values of $P_{exit}$ and m are not critical for the throughput attained in KALOHA-QS, as long as m is larger than just a few queue turns. The results are for steady state, after enough time has elapsed for the queue size to grow to the target value. The arrivals are for packets that are not in the queue, and the nodes in the queue are assumed to transmit freely. So, if the queue size is 0, the case is essentially slotted ALOHA because of the self-clocking of transmissions; and, throughput improves from there with increasing target queue size.

Figure 6:
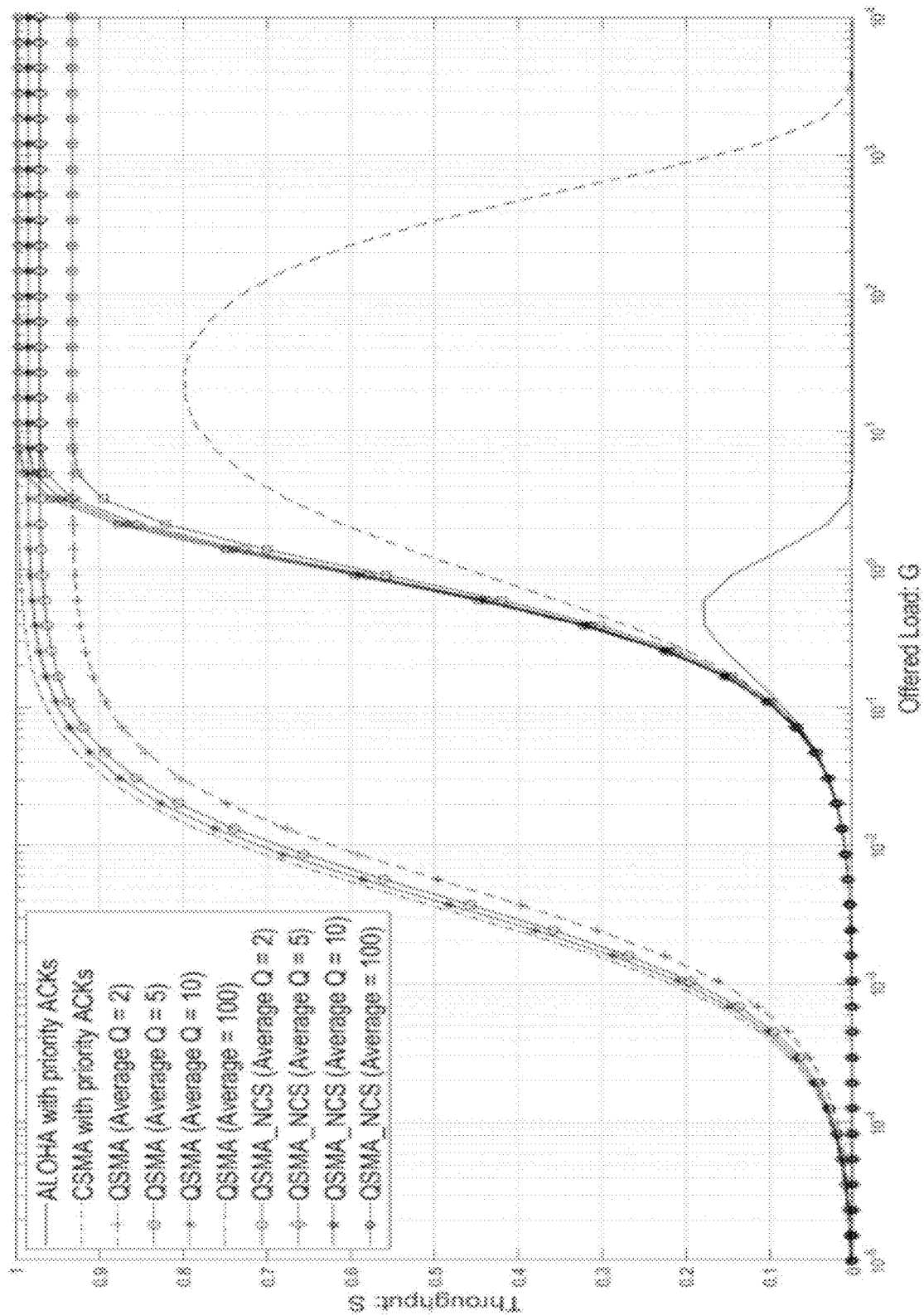
FIG. 6 is a plot that illustrates example throughput for slotted ALOHA and the throughput of queue sharing with and without carrier sensing for different target queue sizes, according to an embodiment.

FIG. 6 is a plot that illustrates example throughput for slotted ALOHA and the throughput of queue sharing with and without carrier sensing for different target queue sizes, according to an embodiment. The horizontal axis indicates offered load, G, and the vertical axis I indicates throughput, both dimensionless.

FIG. 6 shows the throughput of QSMA based on Equations 1 and 2, ALOHA with priority ACK's (Eq. (20) in Garcia-Luna-Aceves, 2019), and CSMA with priority ACK's (Eq. (18) in Garcia-Luna-Aceves, 2019, which is similar to Eq. (26) in Tobagi et al., 1978) assuming a channel data rate of 1 Mbps, physical distances of 500 meters, a data packet of 1500 bytes, which renders a normalized propagation delay of $1 \times 10^{-4}$ sec, and a PLCP of 24 bytes at 1 Mbps normalized to 240 bytes. The turn-around time w is assumed to be the same as a propagation delay, and an ACK in ALOHA and CSMA consists of 40 bytes. The traces depict various values of average queue size (designated Q in FIG. 6). No carrier sensing in QSMA (equivalent to KALOHA-QS but with use of A' instead of A for a join packet) is denoted by "NCS." The results illustrate the high efficiency and stability of QSMA, which outperforms CSMA even when the queue size is only two turns. QSMA is far more efficient than ALOHA and CSMA, and is stable at any load. This is remarkable, given that only carrier sensing is used to attain collision-free transmissions from all the nodes that join the transmission queue.

Carrier sensing is very useful in QSMA at light loads by allowing nodes in the queue to quickly take over unused queue turns or request turns after detecting no carrier at the start of a given turn, resulting in a very aggressive transmission policy without collisions. At high loads, carrier sensing in QSMA does not provide a significant advantage over KALOHA-QS, because most request and queue turns tend to be used.

Figure 7:
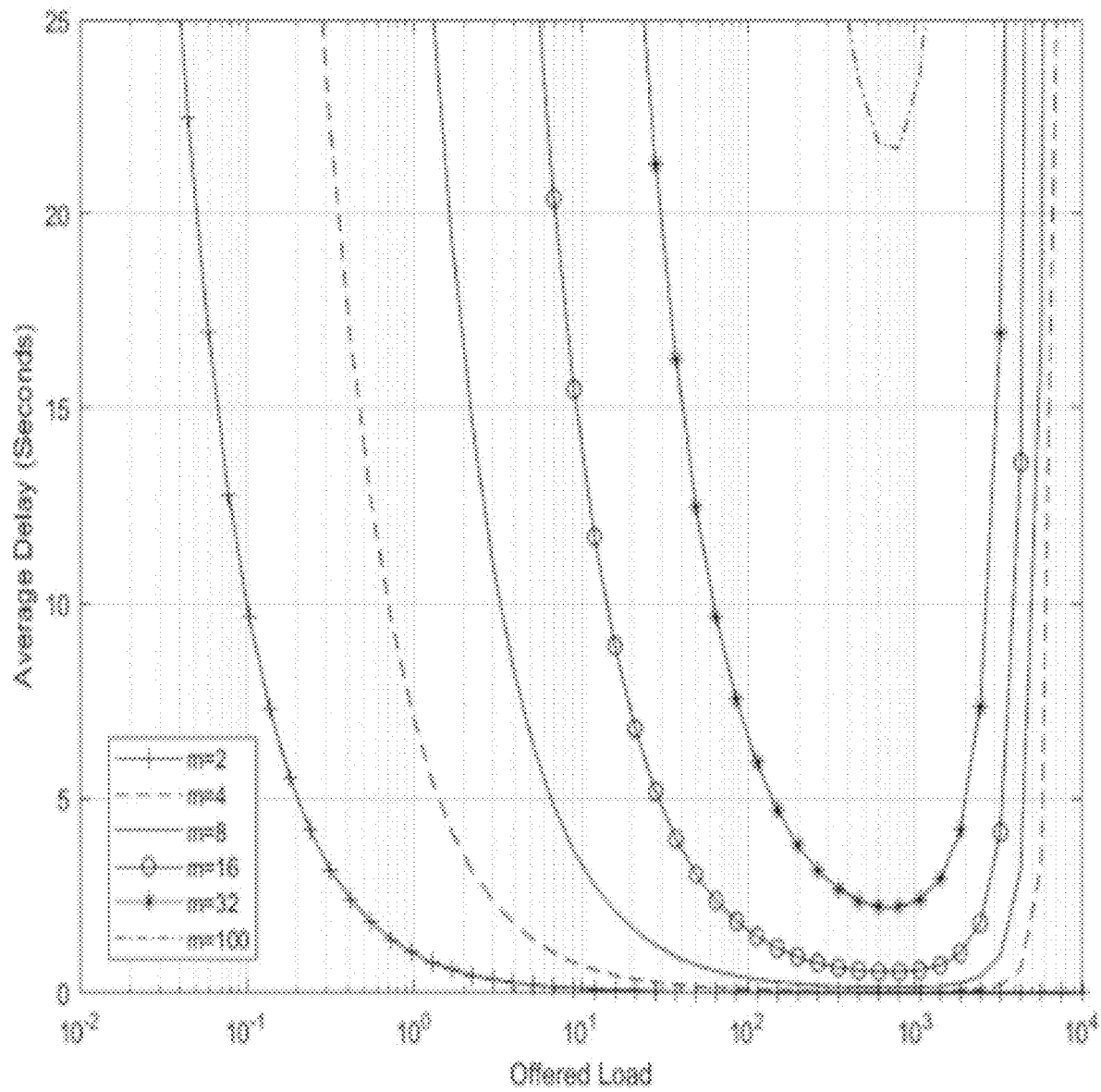
FIG. 7 is a plot that illustrates example average delay with carrier sensing for different target queue sizes, according to an embodiment.

FIG. 7 is a plot that illustrates example average delay with carrier sensing for different target queue sizes, m, according to an embodiment. The horizontal axis indicates offered load, G, which is dimensionless; and, the vertical axis indicates average delay in seconds. FIG. 7 shows the average delay incurred in QSMA to reach different target queue sizes (m) as a function of the normalized number of join requests G=λδ when μ=1 and R=0. It is clear from Equation 14 and FIG. 7 that the average delay incurred in reaching a target queue becomes very large when the target size, m, is large, the average length of data packets is long, and the average number of requests per request turn (AO is much larger than 1. This is because each success would take many cycles to occur and each cycle would last a long time when the queue has many queue turns. However, in a finite network with a target queue size that can accommodate all active nodes, the arrival rate of queue-join requests decreases as more nodes join the queue. This makes the results in FIG. 7 far more promising, because they suggest that a target queue size that includes all active nodes can be reached in just a few seconds even in networks with a hundred nodes.

4. COMPUTATIONAL HARDWARE OVERVIEW

Figure 8:
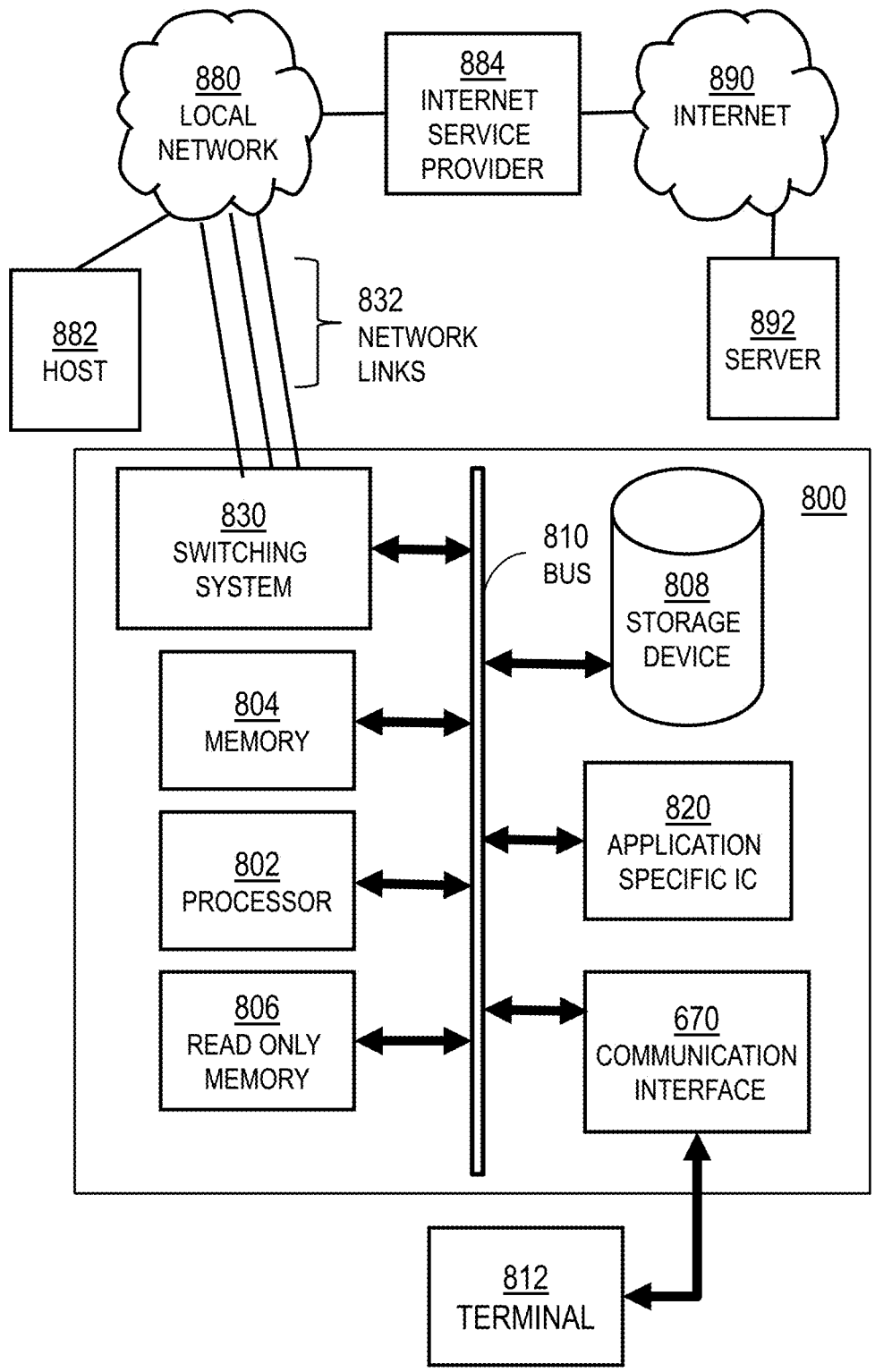
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk, optical disk, solid-state storage or FLASH-EPROM, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 800 includes switching system 830 as special purpose hardware for switching information flow over a network. Switching system 830 typically includes multiple communications interfaces, such as communications interface 870, for coupling to multiple other devices. In general, each coupling is with a network link 832 that is connected to another device in or attached to a network, such as local network 880 in the illustrated embodiment, to which a variety of external devices with their own processors are connected. In some embodiments an input interface or an output interface or both are linked to each of one or more external network elements. Although three network links 832a, 832b, 832c are included in network links 832 in the illustrated embodiment, in other embodiments, more or fewer links are connected to switching system 830. Network links 832 typically provides information communication through one or more networks to other devices that use or process the information. For example, network link 832b may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides routing information for use with switching system 830.

The switching system 830 includes logic and circuitry configured to perform switching functions associated with passing information among elements of network 880, including passing information received along one network link, e.g. 832a, as output on the same or different network link, e.g., 832c. The switching system 830 switches information traffic arriving on an input interface to an output interface according to pre-determined protocols and conventions that are well known. In some embodiments, switching system 830 includes its own processor and memory to perform some of the switching functions in software. In some embodiments, switching system 830 relies on processor 802, memory 804, ROM 806, storage 808, or some combination, to perform one or more switching functions in software. For example, switching system 830, in cooperation with processor 804 implementing a particular protocol, can determine a destination of a packet of data arriving on input interface on link 832a and send it to the correct destination using output interface on link 832c. The destinations may include host 882, server 892, other terminal devices connected to local network 880 or Internet 890, or other routing and switching devices in local network 880 or Internet 890.

Computer system 800 also includes one or more instances of a communications interface 870 coupled to bus 810. Communication interface 870 provides a two-way communication coupling to a variety of external devices that operate with their own processors, such as printers, scanners and external disks. In general the coupling is with a network link 832 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. As another example, communications interface 870 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 832 and other networks through communications interface 870, carry information to and from computer system 800. Computer system 800 can send and receive information, including program code, through the networks 880, 890 among others, through network link 832 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 832. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
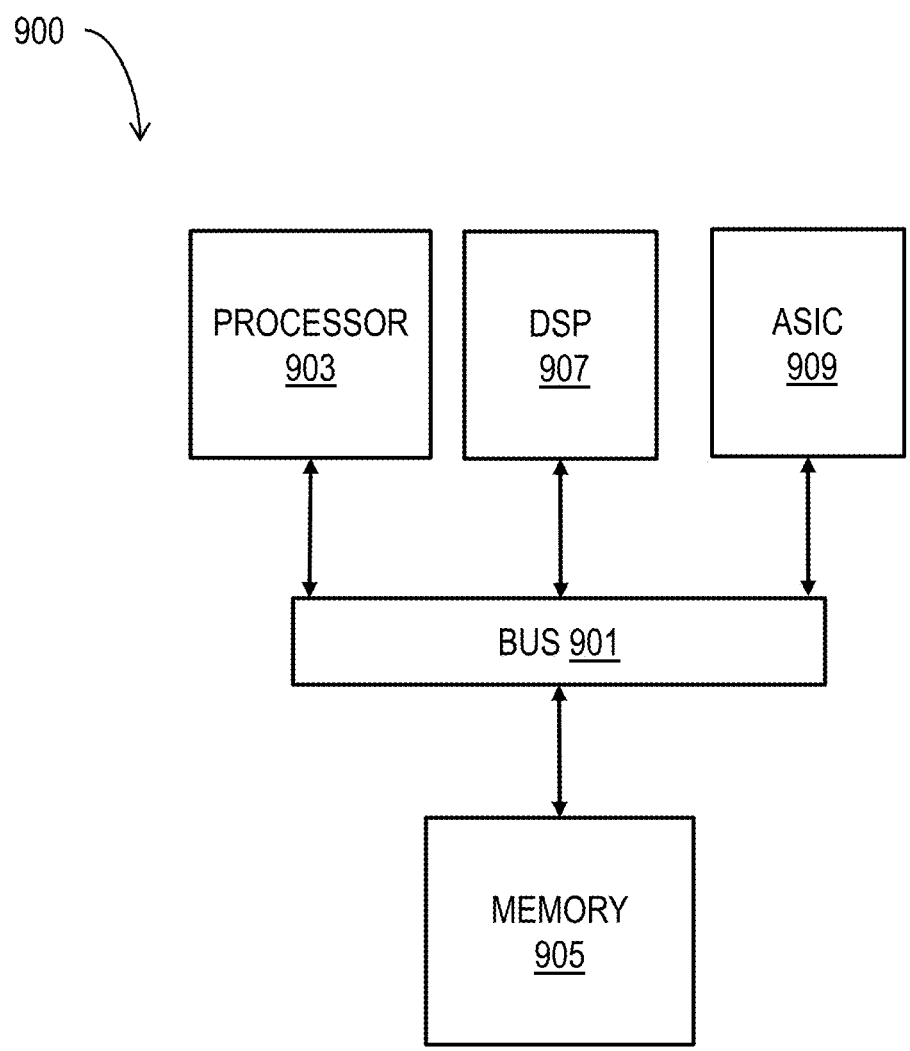
FIG. 9 illustrates a chip set upon which an embodiment of the invention may be implemented.

FIG. 9 illustrates a chip set 900 upon which an embodiment of the invention may be implemented. Chip set 900 is programmed to perform one or more steps of a method described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of a method described herein.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 905 also stores the data associated with or generated by the execution of one or more steps of the methods described herein.

Figure 10:
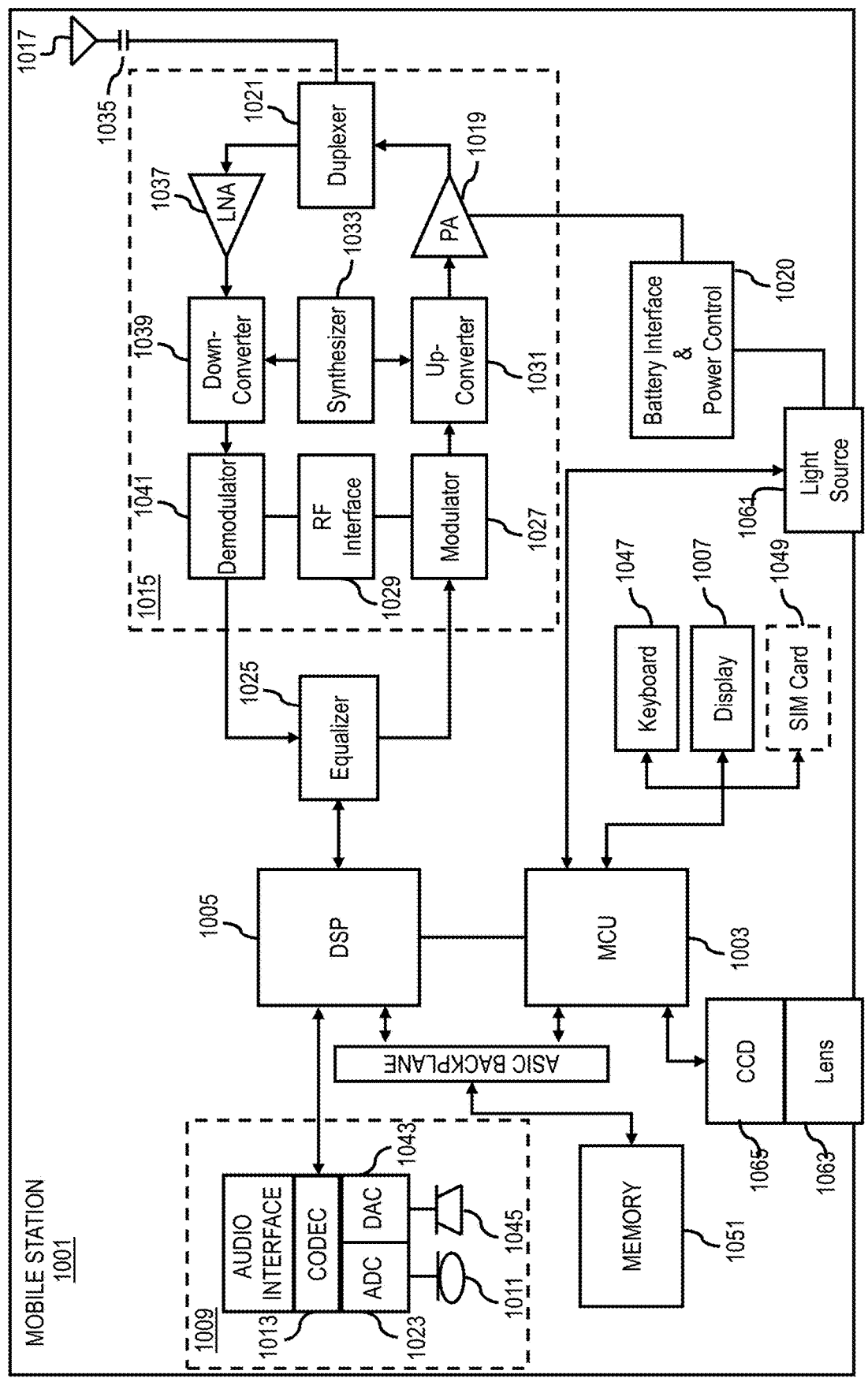
FIG. 10 is a diagram of example components of a mobile terminal (e.g., cell phone handset) for communications, which is capable of operating in the system of FIG. 1, according to one embodiment.

FIG. 10 is a diagram of exemplary components of a mobile terminal 1000 (e.g., cell phone handset) for communications, which is capable of operating in the system of FIG. 2C, according to one embodiment. In some embodiments, mobile terminal 1001, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps as described herein. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 as described herein. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet.

The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

In some embodiments, the mobile terminal 1001 includes a digital camera comprising an array of optical detectors, such as charge coupled device (CCD) array 1065. The output of the array is image data that is transferred to the MCU for further processing or storage in the memory 1051 or both. In the illustrated embodiment, the light impinges on the optical array through a lens 1063, such as a pin-hole lens or a material lens made of an optical grade glass or plastic material. In the illustrated embodiment, the mobile terminal 1001 includes a light source 1061, such as a LED to illuminate a subject for capture by the optical array, e.g., CCD 1065. The light source is powered by the battery interface and power control module 1020 and controlled by the MCU 1003 based on instructions stored or loaded into the MCU 1003.

5. ALTERNATIVES, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein, such as subranges to avoid any prior art. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

6. REFERENCES

Each of the references in the Appendix is hereby incorporated by reference as if fully set forth herein, except for terminology that is inconsistent with that used herein.

N. Abramson, "The ALOHA System—Another Alternative for Computer Communications," Proc. Fall Joint Computer Conference '70, 1970.

L. Bao and J. J. Garcia-Luna-Aceves, "A New Approach to Channel Access Scheduling for Ad Hoc Net-works," Proc. ACM MobiCom '01, July 2001.

L. Bao and J. J. Garcia-Luna-Aceves, "Hybrid Channel Access Scheduling in Ad Hoc Networks," Proc. IEEE ICNP '02, November 2002.

D. Bertsekas and R. Gallager, Data Networks, Prentice-Hall, 1992.

D. Bertsekas and R. Gallager, Data Networks, Prentice-Hall, 1992.

A. Boukersche, et al., Handbook of Algorithms for Wireless Networking and Mobile Computing, CRC Press, 2005.

J. Capetanakis, "Tree Algorithm for Packet Broadcasting Channel," IEEE Trans. Info. Theory, 1979.

F. Clazzer et al., "Enhancing Contention Resolution ALOHA Using Combining Techniques," IEEE Trans. Commun., 2018.

Y. Chu et al., "ALOHA and Q-Learning based Medium Access Control for Wireless Sensor Networks," Proc. IEEE ISWCS '12, 2012.

A. Laya et al., "Goodbye, ALOHA!," IEEE Access, April 2016.

R. Garces and J. J. Garcia-Luna-Aceves, "Collision Avoidance and Resolution Multiple Access with Transmission Groups," Proc. IEEE INFOCOM '97, April 1997.

J. J. Garcia-Luna-Aceves, "Carrier-Sense Multiple Access with Collision Avoidance and Detection," Proc. ACM MSWiM '17, 2017.

J. J. Garcia-Luna-Aceves, "KALOHA: ike i ke ALOHA," Proc IEEE MASS 2019, November 2019.

J. J. Garcia-Luna-Aceves and A. N. Masilamani, "NOMAD: Deterministic Collision-Free Channel Access with Channel Reuse in Wireless Networks," Proc. IEEE SECON '11, June 2011.

A. C. V. Gummalla and J. O. Limb, "Wireless Medium Access Control Protocols," IEEE Commun. Surveys & Tutorials, 2000.

C. Horning, "A Standard for the Transmission of IP Datagrams over Ethernet Networks," RFC 894, IETF, April 1984.

G. Jakllari and R. Ramanathan, "A Sync-less Time-Divided MAC Protocol for Mobile Ad-hoc Networks," IEEE MILCOM '09, October 2009.

G. Jakllari, M. Neufeld and R. Ramanathan, "A Framework for Frameless TDMA Using Slot Chains," Proc. IEEE MASS 2012, October 2012.

R. Jurdak et al., "A Survey, Classification and Comparative Analysis of Medium Access Control Protocols for Ad Hoc Networks," IEEE Communications Surveys, 2004

E. Khaleghi et al., "Near-Far Effect on Coded Slotted ALOHA," Proc. IEEE PIMRC 2017 Workshop on The Internet of Things (IoT), October 2017.

C. Kissling, "Performance Enhancements for Asynchronous Random Access Protocols over Satellite," Proc. IEEE ICC '11, June 2011.

L. Kleinrock and F. A. Tobagi, "Packet Switching in Radio Channels: Part I—Carrier Sense Multiple-Access Modes and Their Throughput-Delay Characteristics," IEEE Trans. Commun., 1975.

A. Muir and J. J. Garcia-Luna-Aceves, "Supporting Real-Time Multimedia Traffic in a Wireless LAN," Proc. SPIE Multimedia Computing and Networking '97, February 1997.

A. Muir and J. J. Garcia-Luna-Aceves, "An Efficient Packet-Sensing MAC Protocol for Wireless Networks," Mobile Networks and Applications, 1998.

ns3 Network Simulator. On the World Wide Web domain nsnam super-domain org.

H. Okada et al., "Analysis and Application of Framed ALOHA Channel in Satellite Packet Switching Networks—FADRA Method," Electron. Commun. in Japan, 1977

E. Paolini, G. Liva, and M. Chiani, "Coded Slotted ALOHA: A Graph-Based Method for Uncoordinated Multiple Access," IEEE Trans. Information Theory, December 2015.

M. Ramalho et al., "RTP Payload Format for G.711.0," RFC 7655, IETF, November 2015.

S. Ramanathan and E. L. Lloyd, "Scheduling Algorithms for Multihop Radio Networks," IEEE/ACM Trans. Networking, 1993.

L. G. Roberts, "ALOHA Packet System with and without Slots and Capture," ACM SIGCOMM CCR, April 1975.

F. C. Schoute, "Dynamic Frame Length ALOHA," IEEE Transactions on Communications, 1983.

A. Sgora et al., "A survey of TDMA Scheduling Schemes in Wireless Multihop Networks," ACM Computing Surveys, 2015.

C. Stefanovic et al., "Frameless ALOHA Protocol for Wireless Networks," IEEE Commun. Letters, December 2012.

Z. Tang and J. J. Garcia-Luna-Aceves, "Hop Reservation Multiple Access (HRMA) for Ad-Hoc Networks," Proc. IEEE INFOCOM '99, 1999.

F. Tobagi and L. Kleinrock, "The Effect of Acknowledgment Traffic on the Capacity of Packet-Switched Radio Channels," IEEE Trans. Commun., June 1978.

D. J. Vergados et al., "Local Voting: Optimal Distributed Node Scheduling Algorithm for Multihop Wireless Networks," INFOCOM Workshop '17, 2017.

W. Xu and G. Campbell, "A Distributed Queuing Random Access Protocol for a Broadcast Channel," Proc. ACM SIGCOMM '93, October 1993.

C. Zhu and M. S. Corson, "A Five Phase Reservation Protocol (FPRP) for Mobile Ad Hoc Networks," Proc. IEEE INFOCOM '98, 1998.

Y. Yan et al., "Adaptation of the ALOHA-Q Protocol to Multi-Hop Wireless Sensor Networks," Proc. IEEE European Wireless '14, May 2014.

J. Yu and L. Chen, 'Stability Analysis of Frame Slotted Aloha Protocol," IEEE Trans. Mobile Computing, May 2017.

C. Zhu and M. S. Corson, "A Five Phase Reservation Protocol (FPRP) for Mobile Ad Hoc Networks," Proc. IEEE INFOCOM '98, 1998.

What is claimed is:

1. A method for collaborative queue of time turns for transmitting data packets on a shared radio channel in a data communications network of a variable number of nodes, the method comprising: storing, on a local node of the data communications network, a current number of turns in a transmitting queue and a current turn based on any contents of a queue size field and a queue current turn field, respectively, in each header of zero or more data packets received from other nodes on the shared radio channel, wherein a turn is a predetermined amount of time on the channel; upon determining that there is a first local data packet of at least one local data packet to transmit, obtaining a local transmit turn for the local node in the queue based on successfully transmitting the first local data packet by the local node in a time interval following a last turn in the queue, wherein the time interval is less than a maximum time interval value, and a first data link layer header in the first data packet includes queue fields that hold data that indicate the current number of nodes in the transmitting queue, the local transmit turn, and a request for adding the local transmit turn, thereby ending the current turn; while there is still a remaining local data packet of the at least one local data packet to transmit and the current turn is equal to the local transmit turn, transmitting the remaining local data packet in which the queue fields indicate the current number of turns in the transmitting queue, the current turn, and no request for adding a turn; and determining that the local data packet was successfully transmitted when a successful acknowledgement control packet that uniquely indicates the local data packet is received.

2. The method as recited in claim 1, wherein the queue fields also indicate whether the local node is relinquishing the local transmit turn after successful transmission of the transmitted local data packet.

3. The method as recited in claim 1, wherein each new local transmit turn is added at an end of the queue, so that the current number of turns in the first local data packet is one greater than the current number of turns based on data packets received from other nodes on the channel.

4. The method as recited in claim 2, wherein after the local node relinquishes the local transmit turn, the method further includes decrementing by one the current number of turns in the transmitting queue.

5. The method as recited in claim 1, wherein the first local data packet is not transmitted while the current number of turns is equal to a maximum size for the transmitting queue.

6. The method as recited in claim 5, wherein the maximum size for the transmitting queue is the maximum value represented by one byte of storage, and a length of the queue fields in the data link header is a sum of three bytes and two bits.

7. The method as recited in claim 1, said step of storing the current number of turns in the transmitting queue and the current turn further comprises storing NULL values for the current number of turns in the transmitting queue and the current turn based on zero data packets received from other nodes since the local node entered the network.

8. The method as recited in claim 1, wherein the maximum time interval value is a maximum channel access time (MCAT) that includes a maximum receive-to-transmit turn-around time, a time needed to transmit a largest data packet allowed, and a maximum propagation delay in the network.

9. The method as recited in claim 1, wherein the request for adding the local transmit turn comprises a data field that holds data that indicates a unique identifier for a node that most recently joins the queue.

10. The method as recited in claim 1, further comprising determining that the current turn ends when no carrier is sensed on the channel for a start time that is sufficient for a first bit to be sensed from a remote node that has started transmitting.

11. A non-transitory computer-readable medium carrying one or more sequences of instructions for collaborative queue of time turns for transmitting data packets on a shared radio channel in a data communications network of a variable number of nodes, wherein execution of the one or more sequences of instructions by one or more processors causes the one or more processors to: store, on a local node of the data communications network, a current number of turns in a transmitting queue and a current turn based on any contents of a queue size field and a queue current turn field, respectively, in each header of zero or more data packets received from other nodes on the shared radio channel, wherein a turn is a predetermined amount of time on the channel; upon determining that there is a first local data packet of at least one local data packet to transmit, obtain a local transmit turn for the local node in the queue based on successfully transmitting the first local data packet by the local node in a time interval following a last turn in the queue, wherein the time interval is less than a maximum time interval value, and a first data link layer header in the first data packet includes queue fields that hold data that indicate the current number of nodes in the transmitting queue, the local transmit turn, and a request for adding the local transmit turn, thereby ending the current turn; while there is still a remaining local data packet of the at least one local data packet to transmit and the current turn is equal to the local transmit turn, transmit the remaining local data packet in which the queue fields indicate the current number of turns in the transmitting queue, the current turn, and no request for adding a turn; and determine that the local data packet was successfully transmitted when a successful acknowledgement control packet that uniquely indicates the local data packet is received.

12. The computer-readable medium as recited in claim 11, wherein the queue fields also indicate whether the local node is relinquishing the local transmit turn after successful transmission of the transmitted local data packet.

13. The computer-readable medium as recited in claim 11, wherein each new local transmit turn is added at an end of the queue, so that the current number of turns in the first local data packet is one greater than the current number of turns based on data packets received from other nodes on the channel.

14. The computer-readable medium as recited in claim 12, wherein after the local node relinquishes the local transmit turn, the one or more sequences of instructions further cause the one or more processors to decrement by one the current number of turns in the transmitting queue.

15. The computer-readable medium as recited in claim 11, wherein the first local data packet is not transmitted while the current number of turns is equal to a maximum size for the transmitting queue.

16. The computer-readable medium as recited in claim 15, wherein the maximum size for the transmitting queue is the maximum value represented by one byte of storage, and a length of the queue fields in the data link header is a sum of three bytes and two bits.

17. The computer-readable medium as recited in claim 11, said step of storing the current number of turns in the transmitting queue and the current turn further comprises storing NULL values for the current number of turns in the transmitting queue and the current turn based on zero data packets received from other nodes since the local node entered the network.

18. The computer-readable medium as recited in claim 11, wherein the maximum time interval value is a maximum channel access time (MCAT) that includes a maximum receive-to-transmit turn-around time, a time needed to transmit a largest data packet allowed, and a maximum propagation delay in the network.

19. The computer-readable medium as recited in claim 11, wherein the request for adding the local transmit turn comprises a data field that holds data that indicates a unique identifier for a node that most recently joins the queue.

20. The computer-readable medium as recited in claim 11, the one or more sequences of instructions further cause the one or more processors to determine that the current turn ends when no carrier is sensed on the channel for a start time that is sufficient for a first bit to be sensed from a remote node that has started transmitting.

21. An apparatus for collaborative queue of time turns for transmitting data packets on a shared radio channel in a data communications network of a variable number of nodes, the apparatus comprising: a communications transceiver; at least one processor; and at least one memory including one or more sequences of instructions, the at least one memory and the one or more sequences of instructions configured to, with the at least one processor, cause the apparatus to perform at least the following, store a current number of turns in a transmitting queue and a current turn based on any contents of a queue size field and a queue current turn field, respectively, in each header of zero or more data packets received from other nodes on the shared radio channel, wherein a turn is a predetermined amount of time on the channel; upon determining that there is a first local data packet of at least one local data packet to transmit, obtaining a local transmit turn for the local node in the queue based on successfully transmitting the first local data packet by the local node in a time interval following a last turn in the queue, wherein the time interval is less than a maximum time interval value, and a first data link layer header in the first data packet includes queue fields that hold data that indicate the current number of nodes in the transmitting queue, the local transmit turn, and a request for adding the local transmit turn, thereby ending the current turn; while there is still a remaining local data packet of the at least one local data packet to transmit and the current turn is equal to the local transmit turn, transmitting the remaining local data packet in which the queue fields indicate the current number of turns in the transmitting queue, the current turn, and no request for adding a turn; and determining that the local data packet was successfully transmitted when a successful acknowledgement control packet that uniquely indicates the local data packet is received.

22. The apparatus as recited in claim 21, wherein the queue fields also indicate whether the local node is relinquishing the local transmit turn after successful transmission of the transmitted local data packet.

23. The apparatus as recited in claim 21, wherein each new local transmit turn is added at an end of the queue, so that the current number of turns in the first local data packet is one greater than the current number of turns based on data packets received from other nodes on the channel.

24. The apparatus as recited in claim 22, wherein after the local node relinquishes the local transmit turn, the one or more sequences of instructions are further configured to cause the apparatus to decrement by one the current number of turns in the transmitting queue.

25. The apparatus as recited in claim 21, wherein the first local data packet is not transmitted while the current number of turns is equal to a maximum size for the transmitting queue.

26. The apparatus as recited in claim 25, wherein the maximum size for the transmitting queue is the maximum value represented by one byte of storage, and a length of the queue fields in the data link header is a sum of three bytes and two bits.

27. The apparatus as recited in claim 21, said step of storing the current number of turns in the transmitting queue and the current turn further comprises storing NULL values for the current number of turns in the transmitting queue and the current turn based on zero data packets received from other nodes since the local node entered the network.

28. The apparatus as recited in claim 21, wherein the maximum time interval value is a maximum channel access time (MCAT) that includes a maximum receive-to-transmit turn-around time, a time needed to transmit a largest data packet allowed, and a maximum propagation delay in the network.

29. The apparatus as recited in claim 21, wherein the request for adding the local transmit turn comprises a data field that holds data that indicates a unique identifier for a node that most recently joins the queue.

30. The apparatus as recited in claim 21, the one or more sequences of instructions are further configured to cause the apparatus to determine that the current turn ends when no carrier is sensed on the channel for a start time that is sufficient for a first bit to be sensed from a remote node that has started transmitting.

\* \* \* \* \*